US012430966B2

(12) United States Patent
Kirkjan

(10) Patent No.: US 12,430,966 B2
(45) **Date of Patent: *Sep. 30, 2025**

(54) ELECTRONIC ACCESS CONTROL

(71) Applicant: LockFOB, LLC, Palm Desert, CA (US)

(72) Inventor: Gregory Paul Kirkjan, Palm Desert, CA (US)

(73) Assignee: LockFOB, LLC, Palm Desert, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 18/679,177

(22) Filed: May 30, 2024

(65) Prior Publication Data

US 2025/0104496 A1 Mar. 27, 2025

Related U.S. Application Data

(63) Continuation of application No. 18/154,344, filed on Jan. 13, 2023, now Pat. No. 12,027,001, which is a (Continued)

(51) Int. Cl.
*G07C 9/00* (2020.01)

(52) U.S. Cl.
CPC .................... *G07C 9/00309* (2013.01); *G07C 2009/00325* (2013.01); *G07C 2009/00452* (2013.01); *G07C 2009/00761* (2013.01)

(58) Field of Classification Search
CPC ...... G07C 9/00309; G07C 2009/00325; G07C 2009/00452; G07C 2009/00761;

(Continued)

(56) References Cited

U.S. PATENT DOCUMENTS

| | | | |
|---|---|---|---|
| 3,671,752 | A | 6/1972 | Bostrom |
| 3,733,862 | A | 5/1973 | Killmeyer |

(Continued)

FOREIGN PATENT DOCUMENTS

| | | |
|---|---|---|
| CN | 112360240 | 2/2021 |
| EP | 0 846 823 A1 | 6/1998 |

(Continued)

OTHER PUBLICATIONS

"AL1 Range Data Sheet", Servocell Document No. 900 004, Issue B, Mar. 31, 2005, pp. 1-5.

(Continued)

*Primary Examiner* — Nam V Nguyen
(74) *Attorney, Agent, or Firm* — Knobbe, Martens, Olson & Bear, LLP

(57) ABSTRACT

An embodiment of an electronic access control system includes an electronic key, an electronic lock, and an access control administration program. The electronic key can include program code for switching between a lock mode and a computer mode. In some embodiments, the lock mode and computer mode allow for simplified administration and operation of the access control system. Some embodiments of the electronic key include a rechargeable battery. In some embodiments, the access control system includes a hybrid power supply system having a rechargeable battery and a generator. In some embodiments, the electronic lock includes a piezoelectric latch. In some embodiments, the electronic key is configured to act as a storage device for a computer system. Some embodiments provide an electronic access control system with a streamlined user interface.

24 Claims, 17 Drawing Sheets

Related U.S. Application Data continuation of application No. 17/217,875, filed on Mar. 30, 2021, now Pat. No. 11,574,513.

(60) Provisional application No. 63/003,050, filed on Mar. 31, 2020.

(58) Field of Classification Search
CPC ...... G07C 2009/00841; G07C 9/00817; G07C 2009/00769
USPC ........................ 340/5.65, 5.54, 5.52, 5.2, 5.7
See application file for complete search history.

(56) References Cited

U.S. PATENT DOCUMENTS

| | | | |
|---|---|---|---|
| 4,144,523 | A | 3/1979 | Kaplit |
| 4,157,534 | A | 6/1979 | Schlachter |
| 4,326,124 | A | 4/1982 | Faude |
| 4,558,175 | A | 12/1985 | Genest et al. |
| 4,562,712 | A | 1/1986 | Wolter |
| 4,663,952 | A | 5/1987 | Gelhard |
| 4,686,358 | A | 8/1987 | Seckinger et al. |
| 4,713,660 | A | 12/1987 | Camenzind |
| 4,833,465 | A | 5/1989 | Abend et al. |
| 5,089,692 | A | 2/1992 | Tonnesson |
| 5,140,317 | A | 8/1992 | Hyatt, Jr. et al. |
| 5,144,667 | A | 9/1992 | Pogue et al. |
| 5,198,643 | A | 3/1993 | Miron et al. |
| 5,245,329 | A | 9/1993 | Gokcebay |
| 5,477,041 | A | 12/1995 | Miron et al. |
| 5,491,470 | A | 2/1996 | Veligdan |
| 5,493,882 | A | 2/1996 | Jasper |
| 5,905,446 | A | 5/1999 | Benore et al. |
| 6,046,558 | A | 4/2000 | Larson et al. |
| 6,125,185 | A | 9/2000 | Boesch |
| 6,382,003 | B1 | 5/2002 | Watanuki et al. |
| 6,900,720 | B2 | 5/2005 | Denison et al. |
| 6,965,295 | B2 | 11/2005 | Shimonomoto et al. |
| 6,980,672 | B2 | 12/2005 | Saito et al. |
| 7,009,489 | B2 | 3/2006 | Fisher |
| 7,009,490 | B2 | 3/2006 | Wong et al. |
| 7,549,161 | B2 | 6/2009 | Poo et al. |
| 7,821,395 | B2 | 10/2010 | Denison et al. |
| 8,035,477 | B2 | 10/2011 | Kirkjan |
| 8,209,462 | B2 | 6/2012 | Cheng et al. |
| 8,228,030 | B2 | 7/2012 | Pukari et al. |
| 8,339,239 | B2 | 12/2012 | Kirkjan |
| 8,347,674 | B2 | 1/2013 | Trempala et al. |
| 8,354,814 | B2 | 1/2013 | Buckingham et al. |
| 8,468,861 | B2 | 6/2013 | Pukari et al. |
| 8,516,250 | B2 | 8/2013 | Lohiniva et al. |
| 8,581,690 | B2 | 11/2013 | Lappalainen et al. |
| 8,761,390 | B2 | 6/2014 | Peirce et al. |
| 8,774,714 | B2 | 7/2014 | Metivier |
| 8,866,439 | B2 | 10/2014 | Pukari et al. |
| 8,899,081 | B2 | 12/2014 | Pukari et al. |
| 8,904,180 | B2 | 12/2014 | Allen et al. |
| 8,922,333 | B1 | 12/2014 | Kirkjan |
| 8,941,469 | B1 | 1/2015 | Diorio et al. |
| 8,981,899 | B2 | 3/2015 | Pukari et al. |
| 9,020,147 | B2 | 4/2015 | Kawamura et al. |
| 9,205,336 | B1 | 12/2015 | Yano |
| 9,406,178 | B2 | 8/2016 | Pukari |
| 9,558,602 | B1 | 1/2017 | Straz |
| 9,574,376 | B2 | 2/2017 | Kananen |
| 9,626,859 | B2 | 4/2017 | Ribas et al. |
| 9,704,316 | B2 | 7/2017 | Kirkjan |
| 9,984,524 | B2 | 5/2018 | Fares et al. |
| 8,339,239 | C1 | 7/2018 | Kirkjan |
| 10,134,208 | B2 | 11/2018 | Ferry |
| 10,253,528 | B1 | 4/2019 | Pukari |
| 10,378,239 | B2 | 8/2019 | Avganim |
| 10,443,269 | B2 | 10/2019 | Piirainen et al. |
| 10,450,777 | B2 | 10/2019 | Pukari |
| 10,482,697 | B2 | 11/2019 | Kirkjan |
| 10,563,424 | B2 | 2/2020 | Kim |
| 10,580,239 | B2 | 3/2020 | Stephens et al. |
| 10,601,828 | B2 | 3/2020 | Avetisov et al. |
| 10,641,008 | B2 | 5/2020 | Pukari |
| 10,769,873 | B1 | 9/2020 | Sun et al. |
| 10,844,632 | B2 | 11/2020 | Pukari |
| 10,872,484 | B1 | 12/2020 | Pukari |
| 10,890,014 | B2 | 1/2021 | Pukari |
| 10,920,454 | B2 | 2/2021 | Pukari |
| 11,017,621 | B1 | 5/2021 | Pukari |
| 11,080,951 | B2 | 8/2021 | Kirkjan |
| 11,082,412 | B2 | 8/2021 | Leavy et al. |
| D934,817 | S | 11/2021 | Svärd |
| 11,164,407 | B2 | 11/2021 | Tikkanen et al. |
| 11,168,493 | B2 | 11/2021 | Kellokoski |
| 11,228,453 | B2 | 1/2022 | Klink et al. |
| 11,263,344 | B2 | 3/2022 | Vágujhelyi et al. |
| 11,408,205 | B2 | 8/2022 | Piirainen et al. |
| 11,414,887 | B2 | 8/2022 | Piirainen et al. |
| 11,566,446 | B2 | 1/2023 | Pukari |
| 11,574,513 | B2 | 2/2023 | Kirkjan |
| 11,619,069 | B2 | 4/2023 | Pukari |
| 11,804,084 | B2 | 10/2023 | Kirkjan |
| 12,027,001 | B2 * | 7/2024 | Kirkjan .............. G07C 9/00817 |
| 2002/0139156 | A1 | 10/2002 | Aramburu et al. |
| 2002/0180582 | A1 | 12/2002 | Nielsen |
| 2003/0122651 | A1 | 7/2003 | Doi et al. |
| 2004/0225832 | A1 | 11/2004 | Huang |
| 2005/0051621 | A1 | 3/2005 | Wong et al. |
| 2005/0184106 | A1 | 8/2005 | Damrath et al. |
| 2006/0176146 | A1 | 8/2006 | Krishan et al. |
| 2006/0192653 | A1 | 8/2006 | Atkinson et al. |
| 2006/0261932 | A1 | 11/2006 | Ando et al. |
| 2007/0115761 | A1 | 5/2007 | Song |
| 2007/0132550 | A1 | 6/2007 | Avraham et al. |
| 2007/0296545 | A1 | 12/2007 | Clare |
| 2008/0157928 | A1 | 7/2008 | Butler et al. |
| 2009/0256676 | A1 * | 10/2009 | Piccirillo ........... G07C 9/00309 340/5.65 |
| 2010/0073129 | A1 | 3/2010 | Pukari |
| 2010/0096447 | A1 | 4/2010 | Kwon et al. |
| 2010/0201481 | A1 | 8/2010 | Au et al. |
| 2012/0001590 | A1 | 1/2012 | Yeh |
| 2012/0047972 | A1 | 3/2012 | Grant et al. |
| 2012/0096909 | A1 | 4/2012 | Hart et al. |
| 2012/0270496 | A1 | 10/2012 | Kuenzi et al. |
| 2012/0280789 | A1 | 11/2012 | Gerhardt et al. |
| 2014/0292481 | A1 | 10/2014 | Dumas et al. |
| 2015/0102904 | A1 | 4/2015 | Oh et al. |
| 2015/0332533 | A1 | 11/2015 | Meganck |
| 2015/0372813 | A1 | 12/2015 | Brand |
| 2016/0160531 | A1 | 6/2016 | Piirainen et al. |
| 2019/0153752 | A1 | 5/2019 | Pagnoncelli |
| 2020/0291683 | A1 | 9/2020 | Tikkanen et al. |
| 2022/0327877 | A1 | 10/2022 | Pukari |
| 2022/0341218 | A1 | 10/2022 | Piirainen et al. |
| 2023/0120520 | A1 | 4/2023 | Pukari |
| 2023/0386279 | A1 | 11/2023 | Kirkjan |

FOREIGN PATENT DOCUMENTS

| | | |
|---|---|---|
| EP | 2 017 412 | 1/2009 |
| EP | 2 017 413 | 1/2009 |
| EP | 2 017 794 | 1/2009 |
| EP | 2 017 795 | 1/2009 |
| EP | 2 043 055 | 4/2009 |
| EP | 2 157 552 | 2/2010 |
| EP | 1 786 998 | 3/2010 |
| EP | 1 808 816 | 4/2010 |
| EP | 2 336 460 | 6/2011 |
| EP | 2 348 490 | 7/2011 |
| EP | 2 354 389 | 8/2011 |
| EP | 2 592 601 | 5/2013 |
| EP | 2 674 552 | 12/2013 |
| EP | 2 813 647 | 12/2014 |
| EP | 2 859 162 | 7/2016 |
| EP | 3 118 977 | 1/2017 |
| EP | 3 217 365 | 9/2017 |
| EP | 3 363 971 | 8/2018 |

(56) References Cited

FOREIGN PATENT DOCUMENTS

| | | |
|---|---|---|
| EP | 3 373 457 | 9/2018 |
| EP | 3 480 395 | 5/2019 |
| EP | 3 480 396 | 5/2019 |
| EP | 3 666 998 | 6/2020 |
| EP | 3 719 762 | 10/2020 |
| EP | 3 783 175 | 2/2021 |
| EP | 3 819 878 | 5/2021 |
| EP | 3 825 496 | 5/2021 |
| EP | 3 951 727 | 2/2022 |
| EP | 4 144 942 | 3/2023 |
| JP | 2008-014070 | 1/2008 |
| WO | WO 00/009836 | 2/2000 |
| WO | WO 01/023695 | 4/2001 |
| WO | WO 2006/008340 | 1/2006 |
| WO | WO 2007/068794 | 6/2007 |
| WO | WO 2009/010635 | 1/2009 |
| WO | WO 2009/010637 | 1/2009 |
| WO | WO 2009/010638 | 1/2009 |
| WO | WO 2009/010639 | 1/2009 |
| WO | WO 2009/040470 | 4/2009 |
| WO | WO 2013/068344 | 5/2013 |
| WO | WO 2013/186166 | 12/2013 |
| WO | WO 2014/199012 | 12/2014 |
| WO | WO 2017/009277 | 1/2017 |
| WO | WO 2017/153514 | 9/2017 |
| WO | WO 2018/149919 | 8/2018 |
| WO | WO 2018/162367 | 9/2018 |
| WO | WO 2019/086240 | 5/2019 |
| WO | WO 2019/086587 | 5/2019 |
| WO | WO 2019/162560 | 8/2019 |
| WO | WO 2019/162561 | 8/2019 |
| WO | WO 2019/162566 | 8/2019 |
| WO | WO 2021/089907 | 5/2021 |
| WO | WO 2021/099388 | 5/2021 |

OTHER PUBLICATIONS

"AL3 Data Sheet R112", Copyright 2012, RCI Rutherford Controls International Corp., Virginia Beach, VA.

Apple, "iOS Security", iOS 10, White Paper, Mar. 2017, pp. 68.

Diffie, Whitfield, "New Directions in Cryptoography", IEEE Transactions on Information Theory, Nov. 1976, vol. IT-22, No. 6, pp. 644-654.

Diffie, Whitfield, "The First Ten Years of Public-Key Cryptography", Proceedings of the IEEE, May 1988, vol. 76, No. 5, pp. 560-577.

Lake, Josh, "What is the Diffie-Hellman key exchange and how does it work?", https://www.comparitech.com/blog/information-security/diffie-hellman-key-exchange/, Mar. 15, 2019, pp. 16.

Patauner et al., "High Speed FRID/NFC at the Frequency of 13.56 MHz", Sep. 2007, Proceedings from the First International EURASIP Workshop on FRID Technology, Vienna, Austria, pp. 4.

* cited by examiner

ELECTRONIC ACCESS CONTROL

INCORPORATION BY REFERENCE

This application is a continuation of U.S. application Ser. No. 18/154,344, filed on Jan. 13, 2023, now U.S. Pat. No. 12,027,001, which is a continuation of U.S. application Ser. No. 17/217,875, filed on Mar. 30, 2021, now U.S. Pat. No. 11,574,513, and hereby incorporated by reference in its entirety for all purposes herein, and which claims priority to U.S. Provisional Application No. 63/003,050, filed on Mar. 31, 2020 and hereby incorporated by reference in its entirety for all purposes herein. Any and all applications for which a foreign or domestic priority claim is identified in the Application Data Sheet as filed with the present application are hereby incorporated by reference under 37 CFR 1.57.

BACKGROUND

Field

This disclosure relates to the field of electronic access control and, more particularly, to electronic access control systems and methods that provide for improved energy efficiency and security.

Description of the Related Art

Lock and key sets are used in a variety of applications, such as in securing file cabinets, facilities, safes, equipment, and the like. Some traditional mechanical lock and key sets can be operated without the use of electrical energy. However, mechanical access control systems and methods can be costly and cumbersome to administer. For example, an administrator of a mechanical access control system may need to physically replace several locks and keys in a system if one or more keys cannot be accounted for.

Electronic lock and key systems have also been used for several years, and some have proven to be reliable mechanisms for access control. Electronic access control systems can include an electronic key that is configured to connect to a locking mechanism via a key interface. In at least some electronic access control systems, the electronic key can be used to operate the locking mechanism via the key interface.

SUMMARY

An object of some aspects disclosed herein is to provide an electronic key that is capable of functioning as a storage device for digital files. Furthermore, some aspects provide an electronic key configured to function as a memory card reader. Some aspects of an electronic key provide a single connector that interfaces with both an electronic lock and a computer system. Some aspects provide an energy-efficient technique for operating an electronic locking mechanism. Some aspects of an electronic lock include a low power electronic latch that secures a bolt. Some aspects disclosed herein provide an improved electronic locking system that provides a convenient way to charge a power source for the locking system. Some aspects disclosed herein provide an electronic locking system that employs user-supplied mechanical force to generate power to operate an electronic lock and/or to operate an electronic key.

An object of some aspects is to provide for easier administration of an electronic access control system. An object of some aspects is to provide an electronic access system that provides for simplified electronic lock operation by using program logic to evaluate one or more criteria, conditions, or events. Some aspects enable an access control system administrator to replace existing locks in doors, pad locks, or locks in remote locations with electronic locks that do not require a wired electrical connection in order for the lock to be powered. Some aspects enable a single electronic key to replace multiple mechanical keys.

Some aspects provide a rechargeable electronic key for use with an electronic lock. The electronic key includes a memory device; a private key identifier for the electronic key stored in the memory device, the private key identifier being accessible to the electronic lock but not readily accessible to a user of the electronic key; a key controller configured to electrically connect to a lock controller associated with the electronic lock; a power management circuit configured to electrically connect to a power source; and a rechargeable battery. The power management circuit is configured to supply energy from the rechargeable battery to other components of the electronic key, to supply energy from the rechargeable battery to the electronic lock when the electronic key is engaged with the electronic lock, and to recharge the rechargeable battery when the power management circuit is connected to the power source.

In another aspect, an electronic access control system is provided. The electronic access control system includes an electronic lock and an electronic key. The electronic lock includes a bolt; a lock memory; key access information stored in the lock memory; a key connector; and a piezoelectric latch configured to secure the bolt in a fixed position when the piezoelectric latch is in a first state and to allow the bolt to move between a locked position and an unlocked position when the piezoelectric latch is in a second state. The electronic key includes a key memory; a private key identifier stored in the key memory, the private key identifier being accessible to the electronic lock but not readily accessible to a user of the electronic access control system; a lock connector disposed on the key housing, the lock connector being configured to electrically connect to the key connector of the electronic lock; and a battery. The battery is configured to provide energy to actuate the piezoelectric latch between the first state and the second state when the lock connector of the electronic key is inserted into the key connector of the electronic lock, if it is determined that the private key identifier, or the public and private key identifiers, is present in the key access information stored in the lock memory.

In some other aspects, an electronic access control system having switchable power states is provided. The electronic access control system includes an electronic key. The electronic key includes a key housing; a first connector disposed on the key housing, the connector having a key power supply pin and a key ground pin, and the first connector being configured to electrically connect to a digital bus associated with the electronic lock; a microcontroller; a battery; and a switching device connected between the battery and the power supply pin of the first connector and configured to allow energy to flow from the battery to the power supply pin of the first connector when the electric potential on the first connector side of switching device is less than the electric potential on the battery side of the switching device. In some embodiments, the electronic access control system includes an electronic lock. The electronic lock can include a lock chassis; a lock controller; and a second connector having a lock ground pin. The lock ground pin is electrically connected to the lock chassis, and the second connector is configured to electrically connect to the first connector. The key ground pin is isolated from ground when the first connector is not connected to the second connector. The key ground pin connects to the lock chassis, and the battery of the electronic key supplies electrical energy to the electronic access control system, when the first connector is connected to the second connector.

In yet other aspects, an electronic access control system is provided. The electronic access control system includes an electronic lock and an electronic key. The electronic lock includes a lock chassis; a lock controller with nonvolatile memory; and a lock USB connector having a lock ground pin and a lock power supply pin. The lock ground pin is connected to the lock chassis. The electronic key includes a key controller; a key memory; a public key identifier stored in the key memory, the public key identifier being readily accessible to a user of the electronic access control system; a private key identifier stored in the key memory, the private key identifier being accessible to the electronic lock but not readily accessible to a user of the electronic access control system; a key USB connector disposed on the key housing, the key USB connector having a key power supply pin and a key ground pin, and the key USB connector being configured to electrically connect to the lock USB connector of the electronic lock; and a circuit comprising a battery and a diode connected between the battery and the key power supply pin. The key ground pin is isolated from the key USB connector such that, when the key USB connector is inserted into the lock USB connector, the key ground pin connects to the lock USB chassis and the battery of the electronic key supplies energy to the electronic access control system.

In some other aspects, the lock connection interface includes one or more rails and one or more notches. The one or more rails allow the lock connection interface to be inserted into an opening of the electronic lock. The one or more notches prevent decoupling of the lock connection interface from the electronic lock. The lock connection interface can be inserted into the opening of the electronic lock when in a first orientation, and the lock connection interface is prevented from decoupling from the electronic lock when in a second orientation.

Further aspects provide an electronic lock that generates electrical energy for the electronic lock and an electronic key. The electronic lock includes a lock memory; key access information stored in the lock memory; a key connector having a power supply pin; a generator configured to be driven by movement of the electronic key when the electronic key is used in the key connector; a lock circuit; and a latch electrically connected to the lock circuit, the latch being configured to actuate between a locked state and an unlocked state when an identifier associated with the electronic key is present in the key access information stored in the lock memory. The generator is configured to at least partially power the lock circuit and the electronic key.

In further aspects, an electronic key for use with an electronic lock and for storing digital files is provided. The electronic key includes a key memory; a private key identifier for the electronic key, the private key identifier being accessible to the electronic lock but not readily accessible to the user of the electronic key; a digital bus connector, the digital bus connector being configured to electrically connect to a digital bus associated with the electronic lock, and the digital bus connector being configured to electrically connect to a digital bus associated with a computer system having a microprocessor, a main memory, and an operating system; and a microcontroller configured to allow the computer system to access the key memory as a mass storage device.

Additional aspects provide an electronic key for use with an electronic lock. The electronic key includes a socket for a solid state non-volatile memory device; a microcontroller having a non-volatile memory; a public key identifier for the electronic key stored in the non-volatile memory of the microcontroller, the public key identifier being readily accessible to a user of the electronic key; a private key identifier for the electronic key stored in the non-volatile memory of the microcontroller, the private key identifier being accessible to the electronic lock but not readily accessible to the user of the electronic key; and a digital bus connector disposed on the key housing, the digital bus connector being configured to electrically connect to a digital bus associated with the electronic lock.

In some aspects, an electronic access control system with a streamlined user interface is provided. The electronic access control system includes an electronic lock, a first electronic key, and a second electronic key. The electronic lock includes a lock memory configured to store key access information; a lock identifier; a lock controller comprising program code for comparing a key identifier to the key access information stored in the lock memory; and a lock bus connector. The first electronic key includes a first memory device; a lock configuration file comprising key access information for configuring the electronic lock; a first private key identifier for the first electronic key, the first private key identifier being accessible to the lock controller but not readily accessible to a user of the first electronic key; a first key controller comprising program code for providing key access information to the electronic lock when first predetermined criteria are met, program code for accessing the electronic lock when second predetermined criteria are met, and program code for erasing the electronic lock when third predetermined criteria are met; and a first digital bus connector configured to electrically connect to the lock bus connector. The second electronic key includes a second memory device; a second private key identifier for the second electronic key, the second private key identifier being accessible to the lock controller but not readily accessible to a user of the second electronic key; a second key controller comprising program code for accessing the electronic lock without user input when fourth predetermined criteria are met; and a second digital bus connector configured to electrically connect to the lock bus connector.

Additional aspects provide an electronic key for use with an electronic lock. The electronic key includes a gripping portion including a housing. The housing includes a processor and an electronic storage unit. The electronic key includes a data transfer portion connected to the gripping portion. The data transfer portion includes an electronic data communications interface, one or more rails, and one or more notches formed and positioned between a pair of rails of the one or more rails. The data transfer portion moves between a first orientation and a second orientation. When the data transfer portion is in the first configuration, the one or more rails allow the data transfer portion to be inserted into the opening of the electronic lock. When the data transfer portion is in the second configuration, the one or more notches prevent decoupling of the data transfer portion from the electronic lock.

For purposes of summarizing the invention, certain aspects, advantages and novel features have been described herein. Of course, it is to be understood that not necessarily all such aspects, advantages or features will be embodied in any particular embodiment. Moreover, it is to be understood that not necessarily all such advantages or benefits may be achieved in accordance with any particular embodiment of the invention. Thus, for example, those skilled in the art will recognize that the invention may be embodied or carried out in a manner that achieves one advantage or group of advantages as taught herein without necessarily achieving other advantages or benefits as may be taught or suggested herein.

BRIEF DESCRIPTION OF THE DRAWINGS

A general architecture that implements the various features of the invention will now be described with reference to the drawings. The drawings and the associated descriptions are provided to illustrate embodiments of the invention and not to limit the scope of the invention. Throughout the drawings, reference numbers are reused to indicate correspondence between referenced elements.

DETAILED DESCRIPTION

Figure 1:
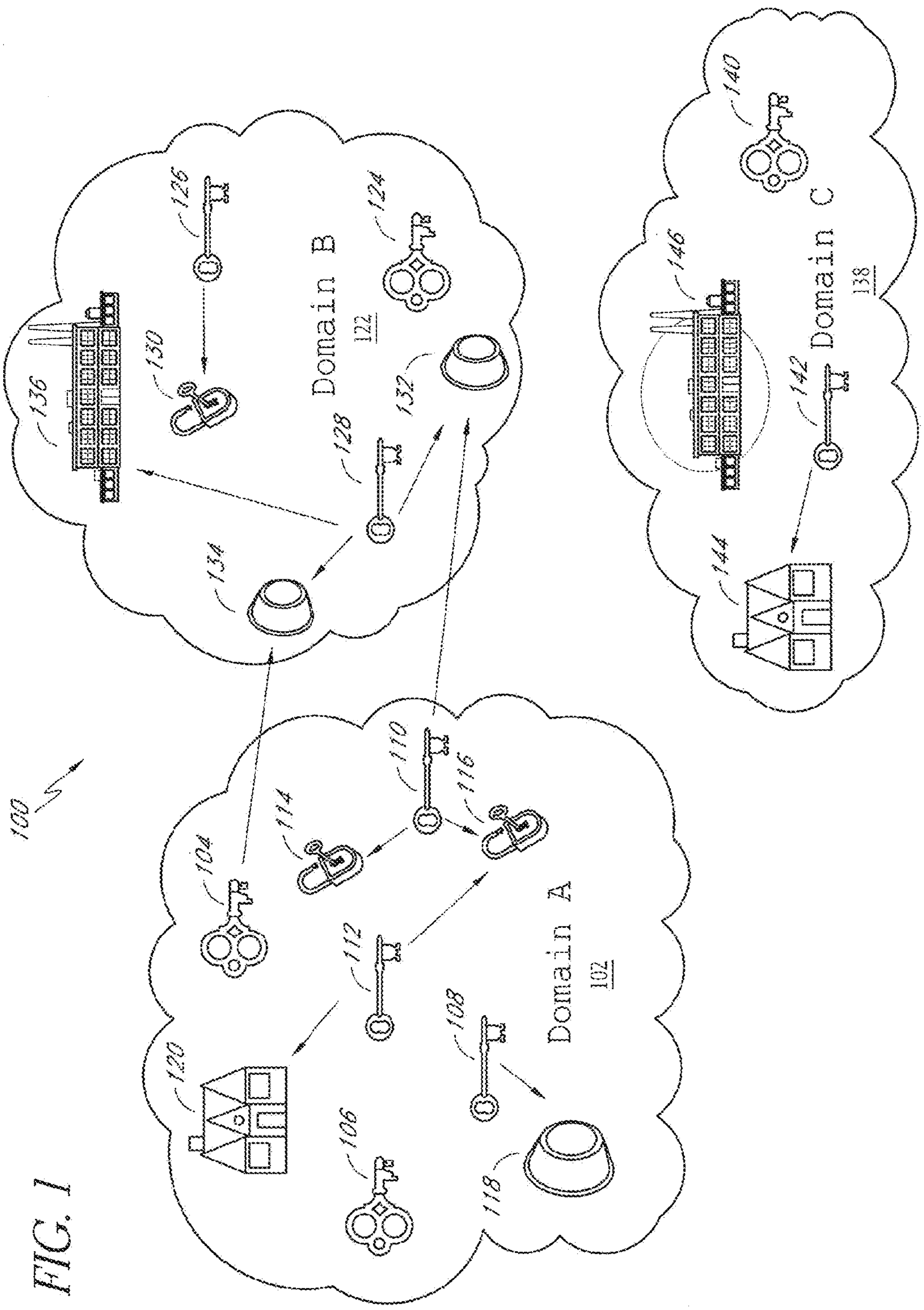
FIG. 1 illustrates an example embodiment of an access control system subdivided into domains.

Systems and methods which represent various embodiments and example applications of the present disclosure will now be described with reference to the drawings. In this description, references to "an embodiment," "one embodiment," or the like, mean that the particular feature, function, structure or characteristic being described is included in at least one embodiment of the technique introduced herein and may be included in multiple embodiments. Occurrences of such phrases in this specification do not necessarily all refer to the same embodiment. On the other hand, the embodiments referred to are also not necessarily mutually exclusive.

This specification includes Appendices A to C that set forth details related to the present disclosure. Each of the Appendices A to C is hereby incorporated by reference in its entirety for all purposes. Appendices A to C relate to various functionalities, features, and aspects of electronic lock and key access systems.

Any combination of features described in these appendices can be implemented in combination with aspects described above. Moreover, any combination of features described in two or more of the appendices can be implemented together. As a non-limiting example, any of the features recited in the summary of certain aspects included in one of the appendices can be combined with any of the features recited in the summary of certain aspects included in one or more of the other appendices, as appropriate.

For purposes of illustration, some embodiments are described in the context of access control systems and methods incorporating a type of Universal Serial Bus (USB) connection. The USB connection can be configured to comply with one or more USB specifications created by the USB Implementers Forum, such as, for example, USB 1.0, USB 1.1, USB 2.0, USB 3.0, USB On-The-Go, Inter-Chip USB, MicroUSB, USB Battery Charging Specification, and so forth. The present disclosure is not limited by the type of connection which the systems and methods employ. At least some of the systems and methods may be used with other connections, such as, for example, an IEEE 1394 interface, a serial bus interface, a parallel bus interface, a magnetic interface, a radio frequency interface, a wireless interface, a custom interface, a Thunderbolt® interface and so forth. At least some of the figures and descriptions, however, relate to embodiments using a USB interface. Although many of the embodiments are described with respect to the USB interface, it should be understood that other interfaces may substitute for the USB interface. The system may include a variety of uses, including but not limited to access control for buildings, equipment, file cabinets, safes, doors, padlocks, etc. It is also recognized that in other embodiments, the systems and methods may be implemented as a single module and/or implemented in conjunction with a variety of other modules. Moreover, the specific implementations described herein are set forth in order to illustrate, and not to limit, the invention. The scope of the invention is defined by the appended claims.

The access control system as contemplated by at least some embodiments generally includes an electronic lock and an electronic key. The electronic lock and the electronic key are configured to communicate with each other via an interface. The electronic lock can include, for example, a bolt, an electronic latch, nonvolatile memory, a key interface or connector, a microcontroller, a generator, one or more gears, a switching regulator, lock configuration information, key access information, an access log, program modules, other mechanical components, and/or other circuits. In some embodiments, the electronic latch includes, for example, a piezoelectric latch or another type of energy-efficient latch or actuator. Two or more functional components of the lock can optionally be integrated into a single physical component. For example, the memory of the lock may be embedded on the same integrated circuit as the microcontroller.

In some embodiments, the electronic key can include, for example, a key housing, a memory device, one or more key identifiers, lock configuration files containing key access information for a lock, a microcontroller, a lock interface or connector, a power source, a memory card slot, program modules, other mechanical components, and/or other circuits. Some embodiments of the electronic key can also include a battery, a battery charger, a digital bus connector, circuitry to detect when the electronic key is connected to another device, a second memory integrated with the microcontroller, a storage device controller, a file system, and/or program logic for determining what actions perform in response to conditions or events.

In some embodiments, the access control system includes an application program for creating a domain file and/or lock configuration files that can be stored on a computer or on electronic keys. In some embodiments, the access control system can be subdivided into domains so that key access information for groups of electronic locks and keys can be managed more efficiently. For example, a domain file can include access control information for all locks and keys in a domain, while a lock configuration file can contain access control information for a single lock in the domain.

FIG. 1 illustrates an example embodiment of an access control system 100 subdivided into three domains 102, 122, 138. A first domain 102 of the access control system 100 includes locks 114, 116, 118, 120 associated with a first controlled access environment, such as, for example, a residence. The locks 114, 116, 118, 120 can include, for example, pad locks, door locks, cabinet locks, equipment locks, or other types of locks. In the embodiment shown in FIG. 1, the first domain 102 includes master keys 104, 106. Master keys have privileges to perform administrative functions on the locks in a domain. For example, in some embodiments, master keys can access, erase, program, or reprogram locks in a domain. Thus, the master keys 104, 106 in the first domain 102 are able to perform any of the master key functions on the locks 114, 116, 118, 120 in the first domain 102. Master keys can also have privileges to access locks in other domains. For example, a master key 104 in the first domain 102 can access a lock 134 in the second domain 122. However, in the embodiment shown in FIG. 1, the master key 104 does not have administrative privileges in the second domain 122 and cannot erase, program, or reprogram the lock 134 in the second domain 122.

In the embodiment shown in FIG. 1, the first domain 102 also includes slave keys 108, 110, 112. Slave keys can have privileges to access one or more locks in a domain but do not have privileges to perform some or all of the administrative functions that master keys can perform. In some embodiments, an access control system administrator can set up a domain such that slave keys have access to only a portion of the locks in a domain. A slave key 110 can also have access privileges to locks 114, 116, 132 in multiple domains 102, 122.

In some cases, a domain 102 may include a single lock or may be defined by the lock. Further, in some cases, a master key may be capable of accessing one lock or multiple locks. In other cases, a relationship may exist or be established between the master key and the lock, or multiple locks independent of a domain. Similarly, a relationship may exist or be established between the slave key and the lock, or multiple locks independent of a domain. In some implementations, a master key is configured to lock and/or unlock a lock, and is capable of enabling other keys (e.g., slave keys) to lock and/or unlock the lock. In contrast, a slave key may lock and/or unlock a lock, but may not be capable of enabling other keys to lock and/or unlock the lock. In some cases, a master key may enable a slave key to lock and/or unlock a lock a certain number of times (e.g., once or twice, etc.) or for a certain period of time (e.g., 1 minute, 5 minutes, 1 hour, etc.).

A second domain 122 of the access control system 100 includes locks 130, 132, 134, 136 associated with a second controlled access environment, such as, for example, a workplace. The second domain 122 includes a master key 124 that has administrative privileges for all of the locks 130, 132, 134, 136 in the second domain 122. The second domain 122 also includes slave keys 126, 128 that have access privileges to some of the locks. Keys in the access control system 100 illustrated in FIG. 1 can belong to more than one domain. A third domain 138 includes a master key 140 that has administrative privileges for locks 144, 146 in the domain. The third domain 138 also includes a slave key 142 that has access privileges for a lock 144 in the domain 138. The third domain 138 is an example of a domain in which the master key 140 and the slave key 142 have no access or administrative privileges outside the domain 138.

Figure 10:
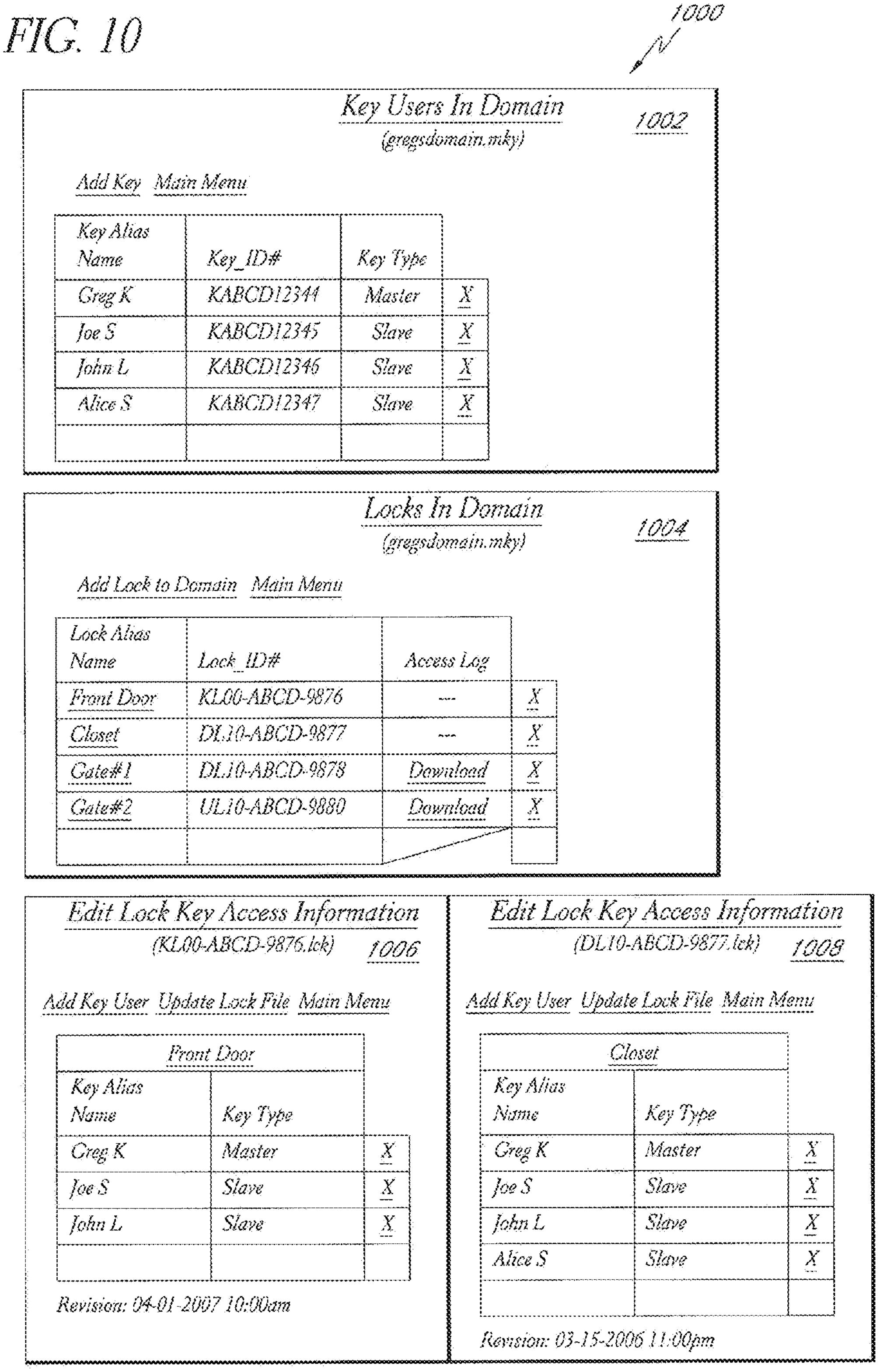
FIG. 10 illustrates an embodiment of an interface for configuring key access information.

In some embodiments, each of the domains 102, 122, 138 is associated with a domain file. The domain file can contain information associated with a domain of the access control system 100, including, for example, key users and locks in a domain. One or more lock configuration files can also be associated with each domain. In some embodiments, a lock configuration file contains key access information associated with an electronic lock. An example interface 1000 for modifying such information is shown in FIG. 10. The domain file can be created or modified by an access control administration application program (an "admin application"). In some embodiments, the domain file can be stored on a master key, on a computer, or on both. In some embodiments, master keys have administrative privileges only in the domains in which they are assigned. Master keys and slave keys can have access privileges for locks in any domain. A domain file can be password protected to increase the security of an access control system. In some embodiments, a person possessing a master key is allowed to use the admin application to modify the domain file and lock configuration files on the master key. For example, the person could reconfigure the domain file and lock configuration files to remove other master keys from the domain. However, in some embodiments, a person must also know a domain password in order to be able to modify the domain file and lock configuration files.

Figure 2:
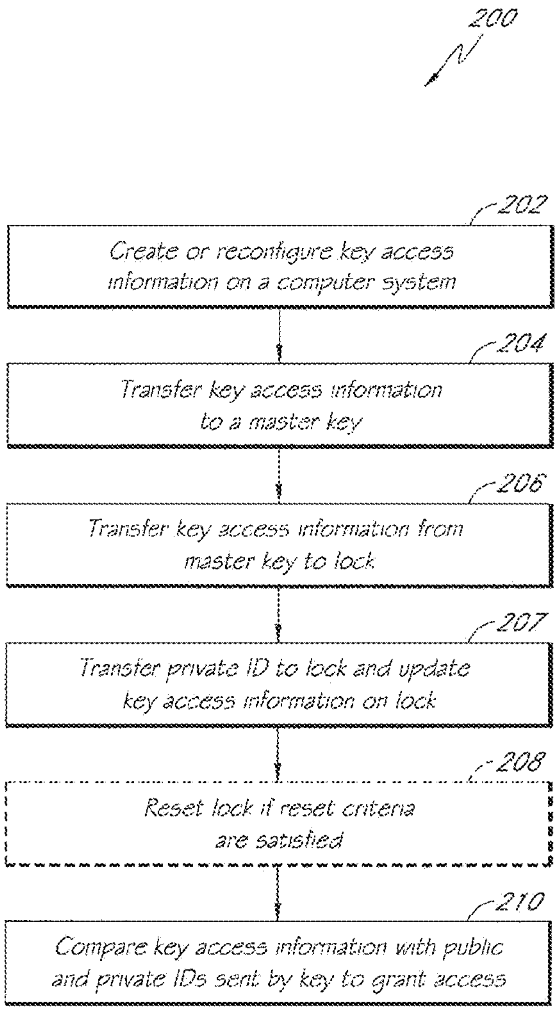
FIG. 2 is a flowchart of an embodiment of a method for configuring and operating an access control system.

The flowchart in FIG. 2 shows an embodiment of a method 200 for configuring and operating an access control system. The method 200 includes creating or reconfiguring key access information (202). In some embodiments, an administrator uses an admin application on a computer to create or reconfigure a domain with one or more master key public key identifiers, slave key public key identifiers, and lock identifiers. The public key identifier of a lock or key can be readily available to a person. For example, the public key identifier can be printed on the lock or key, or it may be visible in some other way. The key access information for a lock can be stored, for example, in a lock configuration file. In some embodiments, a domain file links the lock configuration file to a lock (for example, to an alias of the lock) and associates one or more keys with a user name or alias. The admin application can be configured to translate or interpret lock aliases and key aliases into identifiers associated with the locks and keys, respectively. The name of the domain file may correspond with the name of the domain. In some embodiments, the name of the domain can be changed by renaming the domain file.

In the embodiment shown in FIG. 2, a newly created or reconfigured lock configuration file is transferred to a master key (204). In some embodiments, a user connects the master key to a computer, and the user causes the computer to copy one or more lock configuration files containing the key access information for the domain to a memory on the master key or keys associated with the domain. In alternative embodiments, the copying process can be handled by the admin application. In some embodiments, a user of the computer can also copy other files to the memory of the key while it is connected to the computer. For example, the user may copy her digital music collection, digital photos, digital videos, or digital documents onto the key.

After the lock configuration files containing key access information are transferred to the master key, the master key can be used to program locks in the domain of the master key (206). For example, in some embodiments, the master key can be configured to program or reprogram a lock when a public key identifier and a private key identifier of the master key match identifiers contained in the key access information stored on the lock, when a lock identifier matches the file name of a lock configuration file on the master key, and when a connector on the master key is inserted into the lock. A private key identifier of the master key can also be copied to the lock at the time that the lock is programmed or at some earlier time. The private key identifier is not visible to a person and is not available to the admin application. In some embodiments, when a slave key with a public key identifier present in the key access information of a lock is inserted into, or otherwise communicates (e.g., wirelessly) with, the lock after the lock has been programmed, the slave key copies a private key identifier for the slave key to the lock (207). The lock adds the private key identifiers of the keys that have access privileges to the key access information stored in the lock when the keys are first inserted into, or first communicate with, the lock, after the lock is programmed or reprogrammed.

In some embodiments, a lock in a domain can be configured to update its key access information when a master key for the domain is inserted into, or otherwise communicates with, the lock and when the master key has a more recent revision of the key access information contained in the lock configuration file. For example, if a first master key in a domain is updated by the admin application but a second master key in the domain does not, then the first master key will update locks with new key access information while the second master key will not be allowed to reprogram the locks in the domain with the old key access information until the second master key is updated with newer key access information.

In some embodiments, a master key may be allowed to include key access information for more than one domain. In some embodiments, the admin application is configured such that it does not allow a lock to be present in different domains on the same master key.

In some embodiments, the lock is optionally configured to reset when certain criteria (such as, for example, predetermined criteria) are satisfied (208). In some embodiments, master keys in a domain have lock erase privileges for locks in the domain. In some embodiments, a master key can be configured to erase key access information from a lock when the master key is inserted into the lock after key access information is deleted using the admin application from the lock configuration file on the master key. In some embodiments, an administrator can use the admin application to remove all key access privileges from a lock configuration file. In some embodiments, if the lock configuration file associated with a lock is deleted from a master key, then the lock treats the master key as a slave key. As long as the lock configuration file is missing, the lock grants the master key access privileges only. This can reduce the risk of unintentionally erasing a lock if files are erased mistakenly.

In the embodiment shown in FIG. 2, after collecting private key identifiers from the keys in the domain, the lock is set up to provide access when one of the master or slave keys is inserted into, or otherwise communicates with, the lock (210). For example, the public key identifier in the key access information on the lock can be compared with the public key identifier sent by the key. In some embodiments, the lock determines whether the private key identifier of a key is present in key access information stored in the memory of the lock. In some embodiments, if the private key identifier is present in the lock memory, the lock actuates an electronic latch to provide access. In some embodiments, an administrator of the access control system accesses the locks in a domain with each of the keys in the domain after reconfiguring or creating a domain file and the lock configuration files.

In some embodiments, locks are programmed during manufacturing with an identifier (such as, for example, a public key identifier). Master keys and slave keys can be programmed during manufacturing with a public key identifier and a private key identifier. The private key identifier can be configured to be inaccessible to the admin application and to persons in order to increase the security of the access control system.

Figure 3A:
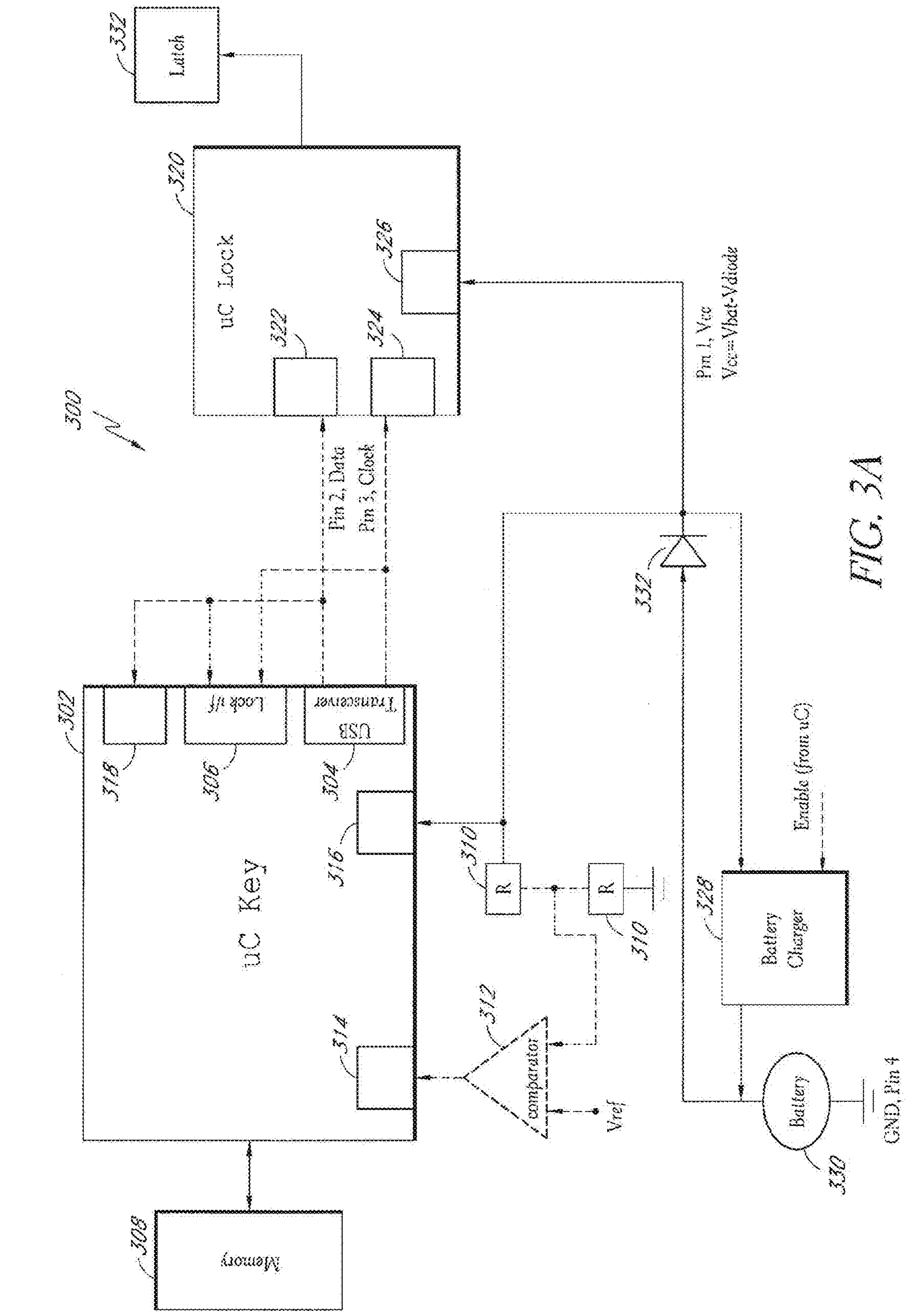
FIG. 3A is a detailed block diagram of an embodiment of an electronic lock connected to an electronic key that includes a rechargeable battery.
Figure 3B:
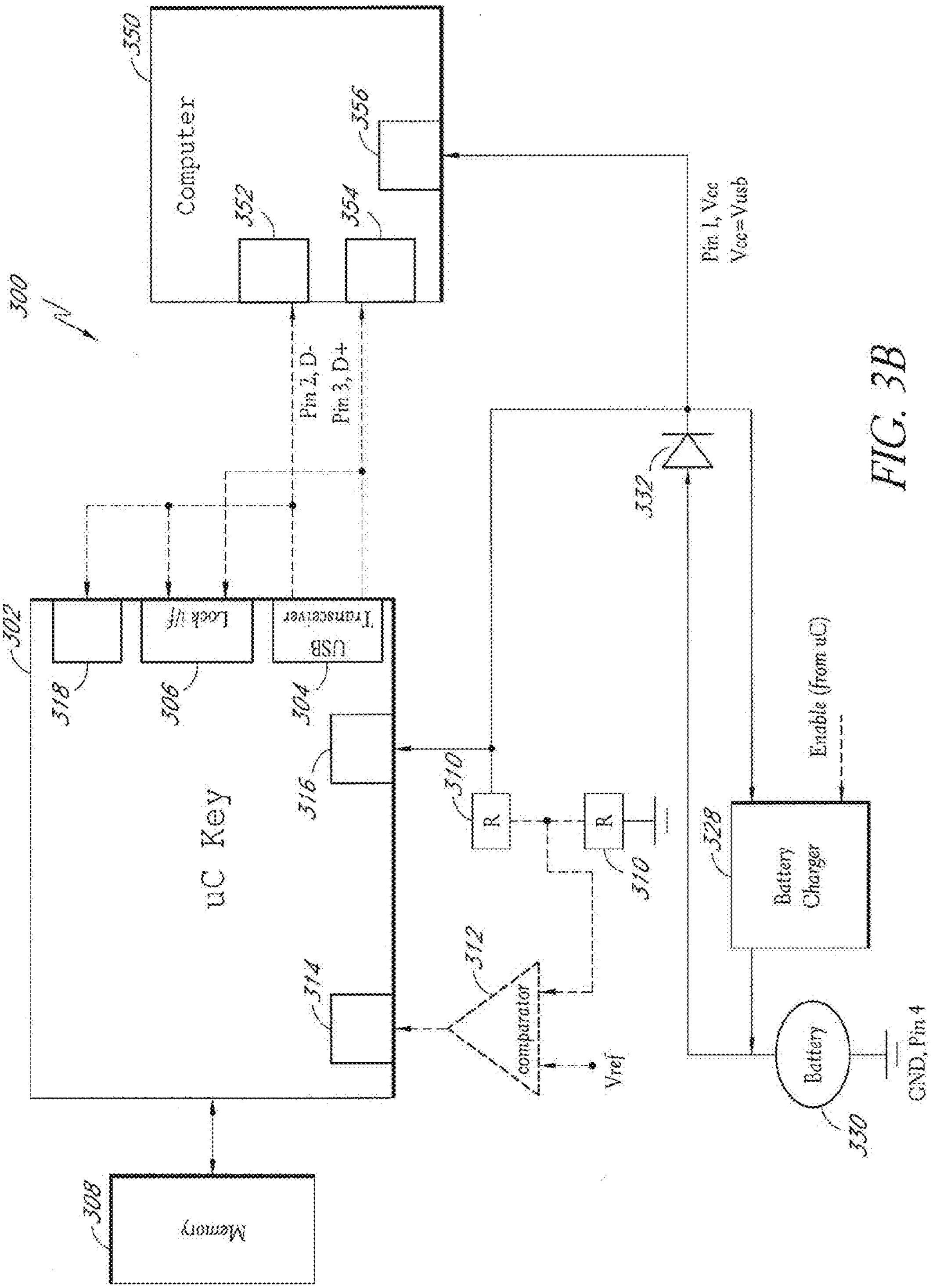
FIG. 3B is a detailed block diagram of an embodiment of a computer connected to an electronic key that includes a rechargeable battery.

FIG. 3A is a detailed block diagram of an embodiment of an electronic lock and key system 300 having a rechargeable battery 330. In some embodiments, at least some of the electronic key components shown in FIGS. 3A and 3B are powered even when the key is not connected to a computer or an electronic lock. The electronic key can include a key microcontroller 302 that is connected to a memory 308. The microcontroller 302 can include any suitable design, including a design that integrates a USB transceiver, a comparator, a voltage reference, and/or a voltage regulator. For example, a microcontroller selected from the SiLabs C8051F34X family of microcontrollers, available from Silicon Laboratories of Austin, TX, may be used. The microcontroller 302 may be a processor that may execute instructions stored in a memory device of an electronic key. The memory 308 can be a nonvolatile memory device, such as NAND flash memory. The memory 308 can also include a memory card or other removable solid state media such as, for example, a Secure Digital card, a micro Secure Digital card, etc. The microcontroller 302 can also have an optional integrated memory (not shown).

In the embodiment shown in FIG. 3A, the microcontroller 302 includes a USB transceiver 304, a lock interface 306, interrupts 314, 318, and an electrical input 316. The microcontroller 302 forms part of a circuit that can include a comparator 312, a diode 332, a battery charger 328, a battery 330, and other circuit components such as resistors 310, a ground plane, pathways of a lock connector, and other pathways. In some embodiments, the lock connector has four pathways or pins: a power supply pin (Pin 1), a data pin (Pin 2), a clock pin (Pin 3), and a ground pin (Pin 4). In lock mode, there can be separate clock and data signals; however, the clock and data can also share the pins on the connector when a four pin connector is used.

The battery 330 can be any suitable rechargeable battery, such as, for example, a lithium-ion battery, and can be configured to provide a suitable electric potential, such as, for example, 3.7 volts. The battery 330 is placed between a ground, such as Pin 4 of the USB connector, and a diode 332. The electronic key can also include a detection circuit. For example, a reference integrated circuit or a Zener diode derived from the power bus feeding 316 (or Pin 1) can be provided to a reference input for comparator 312. The diode 332 can be, for example, a Schottky diode, an energy efficient diode, or another type of diode. In some embodiments, another type of switching device can be used in place of the diode 332. The diode 332 is oriented to allow current to flow from the battery 330 to Pin 1 of the USB connector. Pin 1 of the USB connector is also connected to the electrical input 316 of the microcontroller 302, an input of the comparator 312 (for example, through a voltage splitter circuit including resistors 310 and a connection to ground), and the battery charger 328. The output of the detection circuit (for example, the output of the comparator 312) can be connected to a computer mode interrupt or reset 314 of the key microcontroller.

In the embodiment shown in FIG. 3A, the electronic key is connected to an electronic lock via an external lock connector, such as, for example, a physical connector that is compatible with a USB connector. The electronic lock includes a lock microcontroller 320 and an electronic latch 332. The microcontroller 320 includes a data interface 322, a clock interface 324, and an electrical power interface 326. The data interface 322 connects to Pin 2 of the USB connector, which is connected to the USB transceiver, the lock interface 306, and a lock mode interrupt 318 when the key connector is inserted into the lock connector. In some embodiments, a data signal on Pin 2 sent by lock microcontroller 320 via data interface 322 will trigger the lock mode interrupt or reset 318 of the key microcontroller 302, causing the microcontroller to enter a lock connection mode. When in the lock connection mode, the key microcontroller 302 can communicate with the lock microcontroller 320 via the lock interface 306, and the USB transceiver 304 can be inactive or disabled. When certain criteria are satisfied, the lock microcontroller 320 can perform various operations, such as, for example, erasing a lock memory (not shown), replacing the key access information stored in the lock memory, or opening the lock by causing the latch 332 to actuate. In some embodiments, the latch 332 is a piezoelectric latch or another style of latch or actuator that permits a relatively small amount of energy to actuate the latch. For example, the latch 332 may include a Servocell AL1a actuator available from Servocell Ltd. of Harlow, Essex, UK, an energy efficient latch that consumes less than about 1.2 mW, or another suitable variety of latch or actuator.

When the USB connector on the key is plugged into a lock, Pin 1 of the USB connector attaches to the electrical power interface 326 of the lock. In this state, the electric potential on Pin 1 is substantially equal to the electric potential of a terminal of the battery 330 less any voltage drop across the diode 332, and the diode 332 is closed or "on." The battery 330 provides power to both the electronic key and the electronic lock. Pin 3 of the USB connector attaches to the clock signal generated by the lock microcontroller 320 and/or clock interface 324. The clock signal is routed from a pin on a lock interface 306, for example, to assist in data communications between the lock and key. In some embodiments, when the electronic key is connected to a lock, a USB transceiver 304 is disabled on the key microcontroller 302. However, the USB transceiver 304 can share data and/or clock pins with the lock interface module to decrease connector pin count and to allow a USB connector to be used for both connections.

In some implementations, the key may be a wireless device, such as a smartphone, tablet, or key fob. In some such implementations, the key microcontroller 302 may be a processor or microcontroller included in the wireless device. Alternatively, or in addition, a central processing unit or other general-purpose processor of the wireless device may perform the functionality of the key microcontroller 302 rendering the key microcontroller 302 optional. Further, in some such implementations, the wireless device may communicate wirelessly with the lock that includes the lock microcontroller 320.

FIG. 3B shows a detailed block diagram of an embodiment of a computer 350 connected to an electronic key that includes a rechargeable battery 330. The computer 350 can be, for example, a device containing a host USB interface, a desktop computer, a notebook computer, a handheld computer, a mobile phone, or another type of computing device. When Pin 1 of the USB connector is connected to a powered USB pin 356 (for example, on a computer 350 or on a USB charging device, not shown), the electric potential on Pin 1 is higher than the electric potential at the battery 330 terminal, the output of the comparator 312 changes, and the diode 332 is open or "off." In this state, the electric potential on Pin 1 is substantially equal to the electric potential supplied by a powered USB bus when the USB connector is plugged into a computer. The output change of comparator 312 will trigger the computer mode interrupt or reset 314 of the key microcontroller 302. The microcontroller 302 will enter a computer connection mode.

In computer connection mode, the USB transceiver 304 can be enabled and the lock interface 306 can be inactive or disabled. In some embodiments, the USB connector has four pathways or pins: a power supply pin (Pin 1), a data with clock recovery pin (Pin 2), a data and clock pin (Pin 3), and a ground pin (Pin 4). The D− pin (Pin 2) and D+ pin (Pin 3) are used to transmit differential data signals with encoding that the USB transceivers use to recover a clock. The computer can supply USB data with clock recovery encoding via pins 352, 354 of the computer's USB interface. The USB transceiver 304 can assist in communications between the key and the computer 350. In some embodiments, the microcontroller 302 provides instructions to the battery charger 328 for charging the battery 330 while in the computer connection mode. For example, the battery charger 328 can be a Linear Tech LTC4065L from Linear Technology of Milpitas, CA, a battery charger for a lithium ion battery, or another suitable battery charger.

Just as the key may communicate wirelessly with the lock, in some implementations, the key may communicate wirelessly with the computer 350. For example, the key may communicate using Bluetooth® or Zigbee® with the computer 350. Alternatively, the key may communicate over a wired or wireless LAN connection with the computer 350.

Figure 4A:
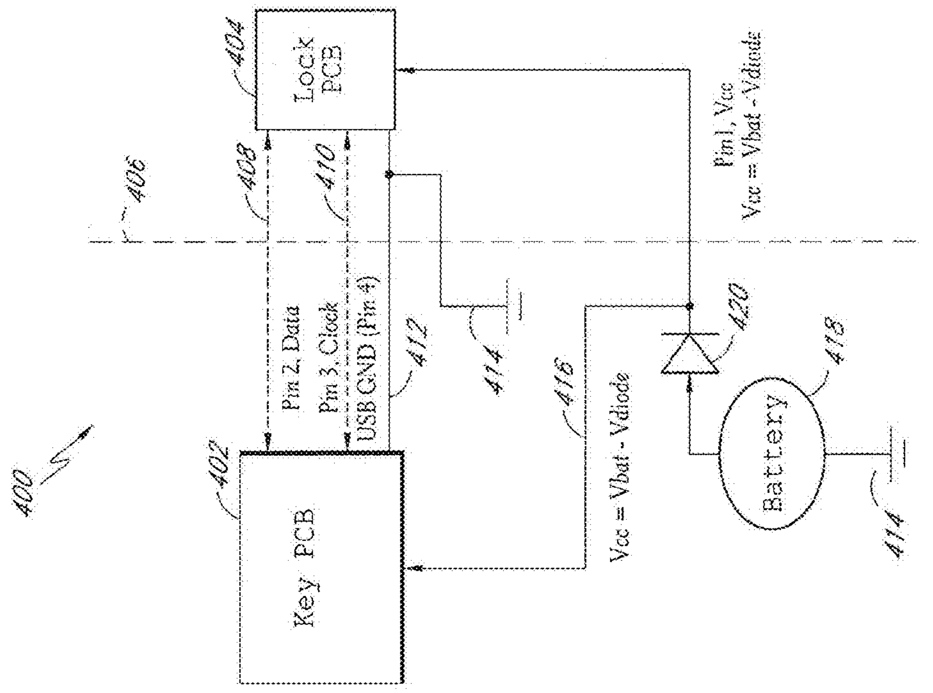
FIG. 4A is a block diagram of an embodiment of an electronic lock connected to an electronic key that uses a connector as a switch.

FIG. 4A is a block diagram of an embodiment of an electronic lock and key system 400 in which the electronic key 402 uses a connection 406 between a lock 404 and the key 402 as a switch. The embodiment shown in FIG. 4A can be implemented in combination with features of the embodiments shown in FIGS. 3A and 3B. In some embodiments, Pin 4 of the USB connector of the key 402 is isolated from a ground, while Pin 4 of the USB connector of the lock 404 is connected to a chassis of the connector. Isolating Pin 4 from ground allows the connector of the key to act like a switch when it is plugged in to the connector of the lock.

When the key connector is inserted into the lock connector, the chassis of the key and the chassis of the lock form an electrical connection 412. The electrical connection 412 provides a ground 414 to the circuit, enabling the battery 418 to power the lock and key system 400. In some embodiments, the ground loop connection is completed by a trace on a circuit board of the lock that connects the ground pin 412 of the USB connector to the chassis of the connector. A diode 420 allows electrical energy to flow from the battery 418 to the key 402 and the lock 404. A data pin 408 and a clock pin 410 provide for communication between the key 402 and the lock 404. The lock 404 may receive power from the key system 400 to operate (e.g., lock and unlock). The key system 400 may be buttonless so that users are not required to actuate a button to lock or unlock the lock 404. For example, the lock 404 may automatically perform an authentication process and actuate a lock upon connection or communication with the key system 400. Similarly, the lock 404 may automatically lock or relock after a connection or communication with the key system 400 is lost, or after a particular period of time. In cases where a button for interacting with the key system 400 and/or lock 404 is included, the button may be a physical button or a touch-sensitive button on a computer screen. In some embodiments, the lock 404 can include one or more rechargeable batteries. The coupling between the lock 404 and the key system 400 can recharge the rechargeable batteries of the key system 400.

Figure 4B:
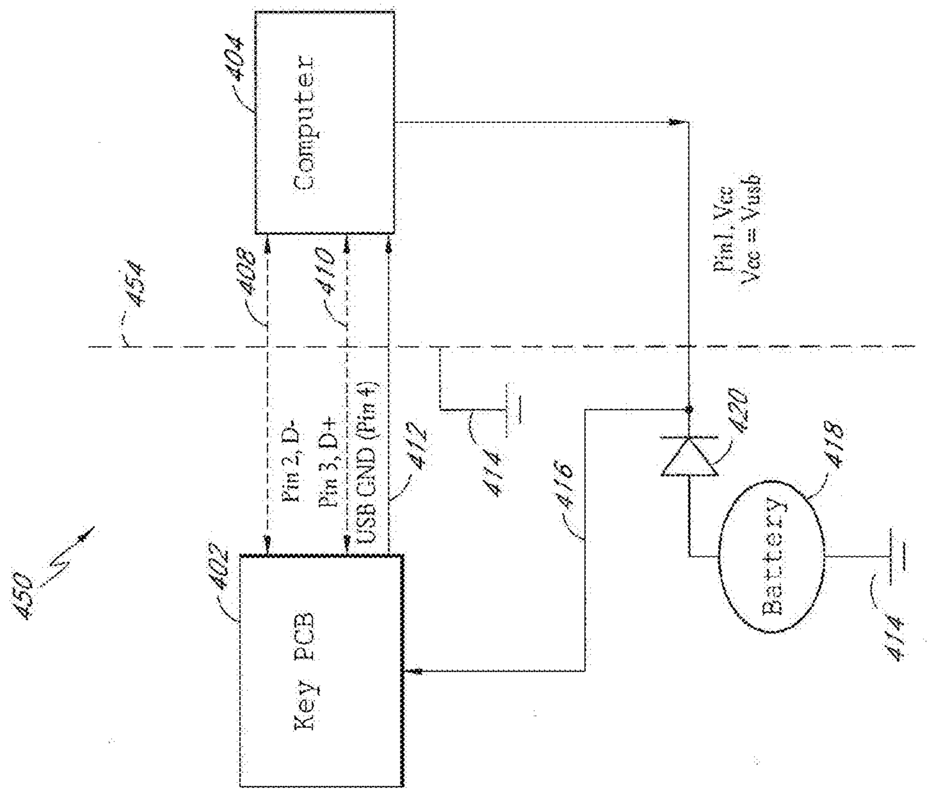
FIG. 4B is a block diagram of an embodiment of a computer connected to an electronic key that uses a connector as a switch.

FIG. 4B is a block diagram of an embodiment of an electronic key and computer system 450 that uses a connector as a switch. In the embodiment shown in FIG. 4B, an electronic key 402 has the same structure as the electronic key 402 described with respect to FIG. 4A. However, when the key 402 is connected to a powered USB port of a computer 404, electrical energy and a ground connection are supplied by the computer 404 to the key 402 because the diode 420 is open or "off". Power from the battery 418 is not used because the battery 418 is isolated from the rest of the circuit by the diode 420. In some embodiments, when the electronic key is not plugged into anything, the negative terminal of the battery 418 has no path to ground because the chassis of the USB connector of the key is isolated from the ground pin 412. Consequently, energy from the battery 418 is not used when the key 402 is not plugged in to the lock 404.

Figure 5:
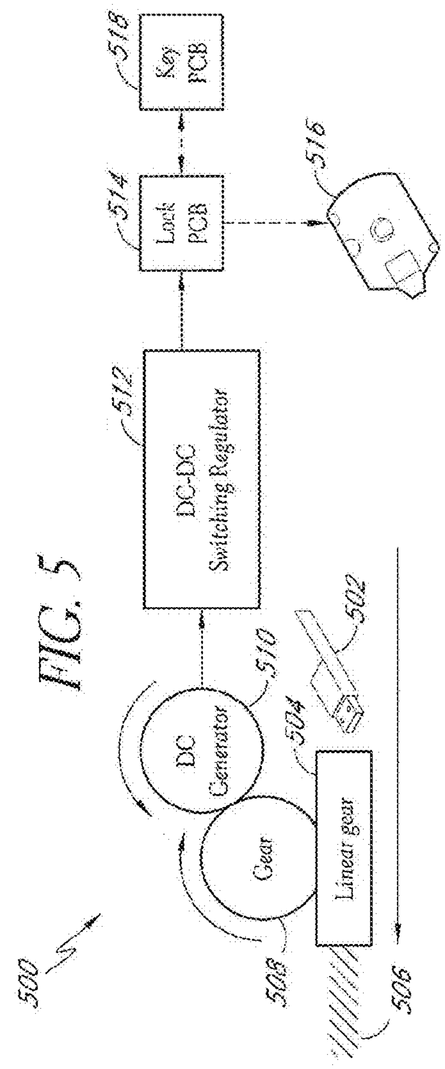
FIG. 5 illustrates an embodiment of an electronic lock and key system configured to convert translational mechanical energy to electrical energy.
Figure 6:
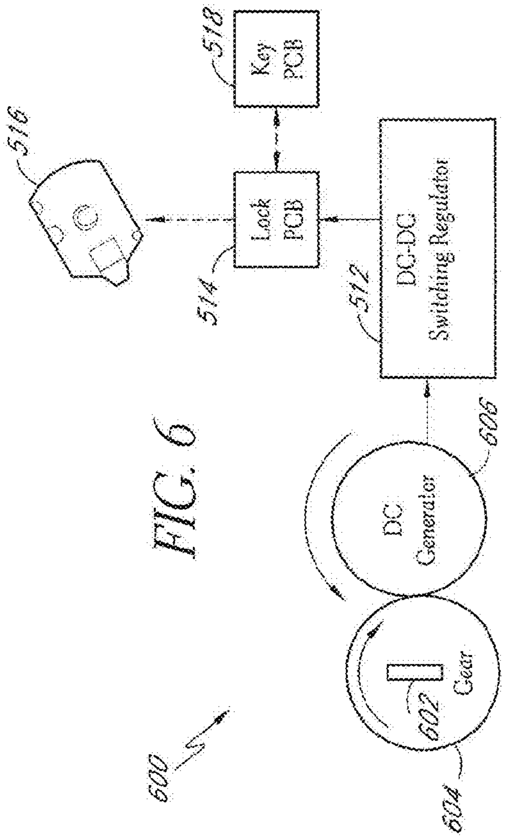
FIG. 6 illustrates another embodiment of an electronic lock and key system configured to convert rotational mechanical energy to electrical energy.

FIG. 5 illustrates an example embodiment of an electronic lock and key system 500 configured to convert translational movement into electrical energy. In the embodiment shown in FIG. 5, a key 502 pushes a linear gear 504 disposed in a lock in order to turn a generator 510. In some embodiments, the gear 504 incorporates a mechanical linkage 508 to the generator 510 that includes a reciprocating linear gear. The generator 510 can be any suitable generator for producing electrical energy, such as a DC generator. In some embodiments, the generator 510 can be an AC generator or an AC generator coupled to a rectifying circuit. The linear gear 504 can be connected to a spring 506 that exerts a force that causes translational movement of the linear gear when the spring is moved out of an equilibrium state. In some embodiments, a switching regulator 512 is disposed between the generator 510 and a printed circuit board (PCB) of the lock 514. The switching regulator 512 can be, for example, a DC-DC buck boost switching regulator with a suitably large capacitor or another type of switching regulator suitable to convert the generator 510 output into a form usable by the lock PCB 514. The lock PCB 514 can include electrical connections to provide power to a latch 516 and/or to a key PCB 518. The latch 516 can include a low power piezoelectric actuator or another style of actuator capable of operating with a relatively small level of energy input. FIG. 6 illustrates another embodiment of an electronic lock and key system 600 configured to convert rotational mechanical energy to electrical energy. In the embodiment shown in FIG. 6, a key aperture 602 (for example, a key hole) is situated substantially coaxially with respect to a gear 604 with a lock. The key aperture 602 can be disposed on a door knob, for example. When an electronic key is inserted into the aperture 602, rotation of the key (for example, when torque is applied to the key by a user) causes the gear 604 to turn a generator 606. As described previously, a switching regulator 512 is disposed between the generator 606 and the lock PCB 514. The generator 606 and/or switching regulator 512 can include one of the configurations described with respect to FIG. 5 or another suitable configuration. Furthermore, the mechanical configuration described with respect to FIG. 5 can be combined with the features shown in FIG. 6 to create a lock capable of converting both translational movement and rotational movement of the key into electrical energy.

In some embodiments, the electronic lock and key system does not use mechanical movement to generate power. Instead, the electronic lock and key system may be powered via a battery. If the battery of the electronic lock is depleted, the battery may be charged or the electronic lock may be powered by a power source (e.g., a battery) within the electronic key upon the electronic key being connected to the electronic lock. Further, in some cases, the electronic lock may not include a battery. In some such cases, the electronic lock is powered by the electronic key upon the electronic key connecting to the electronic lock. For example, upon the electronic key being inserted into the electronic lock, power may be transferred from the electronic key to the electronic lock enabling the electronic lock to operate.

The lock PCB 514 and/or the key PCB 518 shown in FIGS. 5 and 6 can be configured to include at least some of the components or features of the circuits shown in FIGS. 3A, 3B, 4A, and 4B. Thus, the access control systems that include a lock with a generator can also include, for example, a key with a rechargeable battery and/or a connector that serves as a switch. In some embodiments, an access control system 400 includes a battery 418 that supplies power to the system when the electric potential generated by a lock 404 is less than the difference between the electric potential of the battery 418 and the voltage drop across a diode 420 (FIG. 4A). If the electric potential (for example, the voltage) generated by the lock 404 increases, then the battery 418 in the key can automatically shut off. In some embodiments, an access control system includes a power supply system in which both a battery and an electric generator can contribute to powering at least some components of the access control system. In some embodiments, an access control system includes a power supply system in which the generator 606 can provide enough energy to operate the system 600 if the battery 418 in the key is dead. In some embodiments, the generator 606 can increase the probability that the access control system can be powered and operated in emergency situations.

As previously described, in some cases the key may communicate wirelessly with the lock. In some such cases, the key may transfer power wirelessly to the lock to enable the lock to actuate. For example, the key may use electromagnetic, inductive or capacitive power transfer to power the lock. Alternatively, the lock may include a power source, such as a battery or a connection to mains to power the lock. It should be understood that when the lock is not powered, it will typically remain in a locked configuration.

Figure 7:
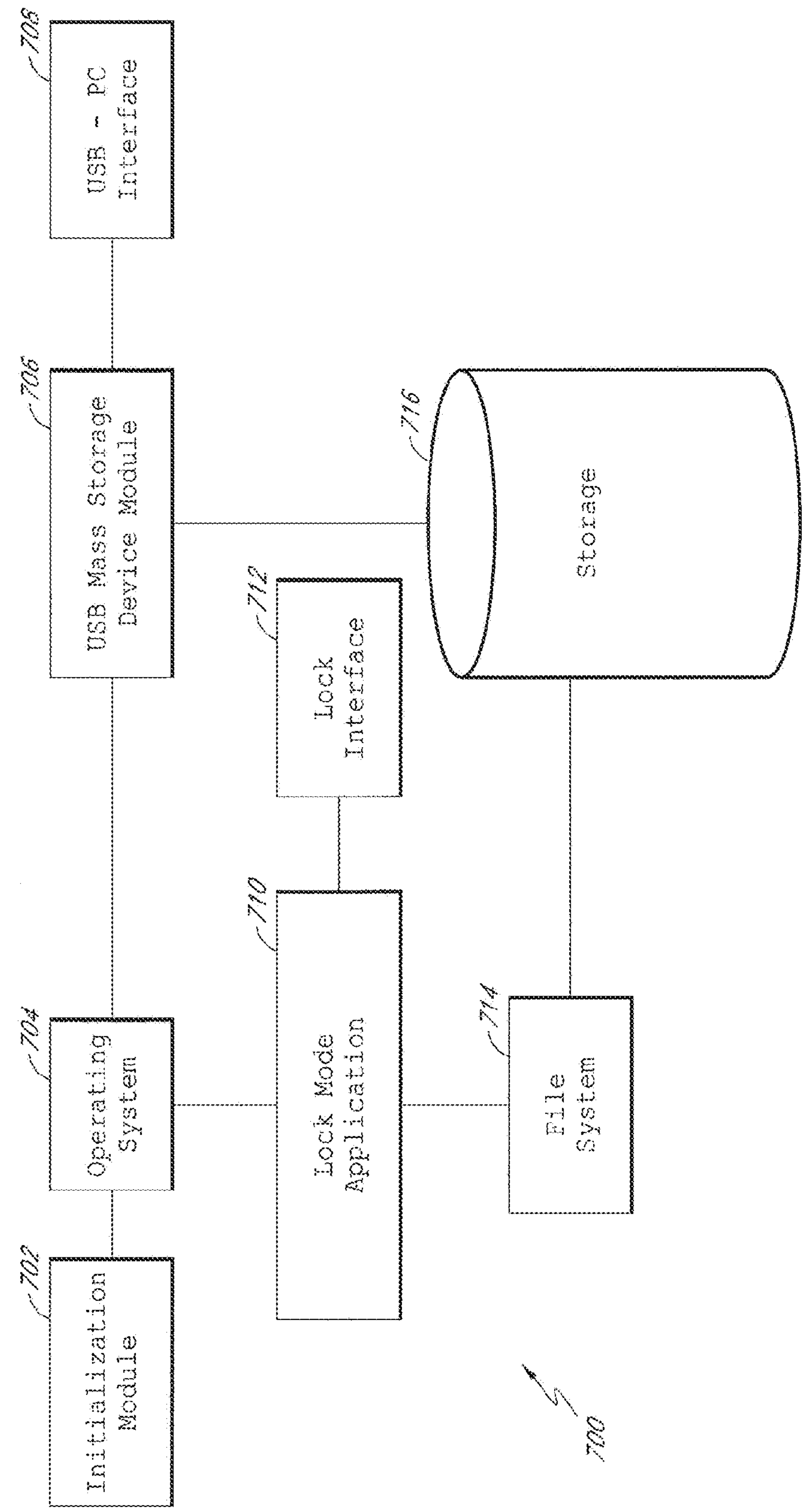
FIG. 7 is a block diagram of an embodiment of an electronic key configured to operate as a storage device for digital files.

FIG. 7 is a block diagram of an embodiment of an electronic key 700 configured to operate as a storage device for digital files. In some embodiments, the modules and program logic shown in FIG. 7 may be embedded as firmware on, for example, the microcontroller of the key. The key 700 includes an initialization module 702 that contains program logic for booting up the key and preparing the hardware of the key to run an operating system 704. In some embodiments, the operating system 704 is a custom operating system that includes program logic for determining when the key is plugged into an electronic lock or a powered USB port of, for example, a computer system.

If it is determined that the key is plugged into or otherwise in communication (e.g., wireless communication) with a lock, the operating system 704 runs a lock mode application 710. The lock mode application includes program logic for handling communications with a lock interface 712 and with a file system 714. For example, if the lock mode application 710 determines, via the lock interface 712, that a lock includes outdated key access information, the lock mode application 710 can use the file system 714 to obtain updated key access information from a storage device 716. The file system 714 can implement, for example, FAT, FAT32, NTFS, UFS, Ext2, HFS, HFS Plus, or another suitable file system implementation. The lock mode application can also be configured to access information from a second key memory embedded in the microcontroller of the key, for example.

If it is determined that the key is plugged into or otherwise in communication (e.g., wireless communication) with a computer system, the operating system 704 loads a USB Mass Storage Device module 706 (a "USB storage module"). The USB Mass Storage Device protocol, created by the USB Implementers Forum, allows the storage 716 to be accessed directly by an operating system on a computer. The operating system 704 communicates with a computer system via the USB storage module 706 and a USB-PC interface 708. The modules and program logic on the electronic key allow it to operate as both an access control device and as a USB storage device.

Figure 8:
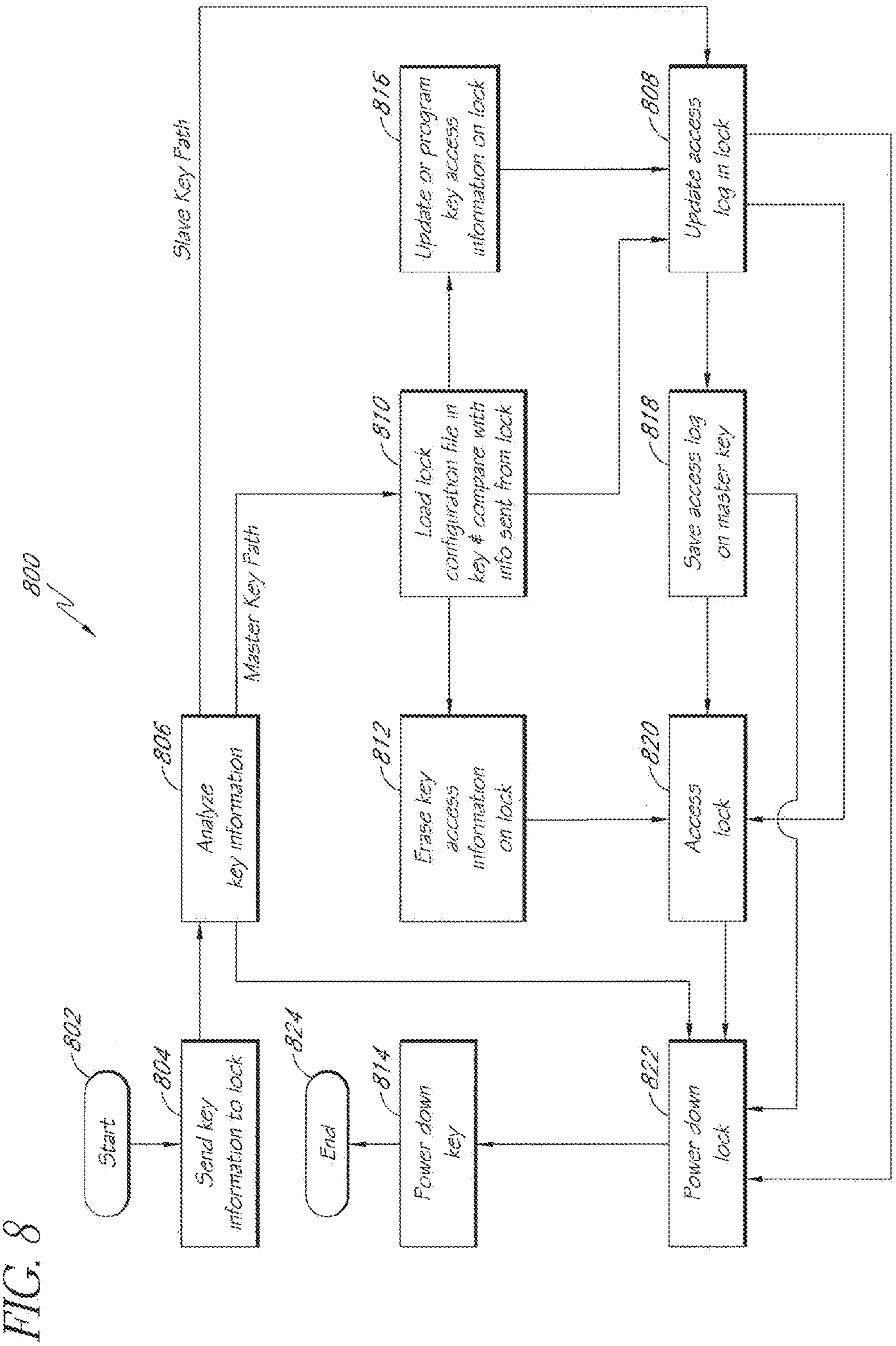
FIG. 8 is a flowchart of an embodiment of a method of operation of an electronic access control system.

FIG. 8 illustrates an example embodiment of a method 800 for operating an electronic lock and key system. The method 800 begins by executing instructions to boot up the electronic key (802). During the boot up stage, the key can optionally perform a biometric read of a user of the key in order to confirm that the user is authorized. When the key is inserted into a lock, or otherwise communicates with the lock, the key sends key information to the lock (804). The key information can include, for example, a public key identifier, a private key identifier of the key. Next, the lock analyzes the key information in order to determine what action to perform (806). The analysis includes determining whether the key information matches key access information stored in the lock. For example, if the public and private key identifiers of the key are found in the lock's key access information, the lock proceeds to update an access log (808).

The analysis (806) can also include determining whether the lock's key access information is expired or if the key has administrative privileges. In some embodiments, if the key access information in the lock is expired and if the key has administrative privileges, the lock sends lock information (such as, for example, a lock identifier) to the key. In response, the key can load the lock's new key access information by using the lock identifier to search for the lock configuration file stored in the keys memory. For example, the name of the lock configuration file can include the lock identifier.

The key compares the lock's key access information revision date with a key access information revision date stored in the key's lock configuration file (810). By comparing the dates instead of comparing the key access information in the lock with the key access information in the lock configuration file, the key can save energy, hasten access to the lock, and hasten reprogramming. If the key access information needs to be updated, or if the lock does not have key access information, the key instructs the lock to update or program the key access information in the lock (816). The lock may also read and store the private key identifier of the key. After the key access information is updated or programmed, the lock proceeds to update an access log (808). If the key access information in the lock configuration file is not revised (for example, if the key access information in the lock configuration file matches the key access information stored in the lock's memory), the lock proceeds directly to update an access log (808). If the key does not have a lock configuration file for the lock it is plugged into or communicating with, the lock can be configured to treat the key as a slave key and update the access log (808) without making any updates to the lock's key access information (KAI).

If the master key loads the lock configuration file (810) and determines that the KAI in the lock configuration file has no key users (for example, if the file shows that no keys have access privileges), then the master key can send a signal to the lock to erase its KAI (812). The analysis (806) can also include determining whether a key is accessing the lock for the first time. If it is the first access for the key, then the lock updates the key's private key identifier in the lock memory's KAI. If the lock erases its key access information (812), then the lock proceeds to grant access (820) and then power down the lock (822).

In some embodiments, the lock and/or the key maintains an access log. If the lock does not have an access log, and if the key access information is successfully updated or programmed, then the lock proceeds to access the lock (820) by, for example, actuating a latch. If the lock does maintain an access log, then the lock can send an access log to the key for storage as an access log file (818) before proceeding to access the lock (820). If the key information does not match the key access information, or if the lock does not successfully update or program its key access information and there is no access log, or if the access log is not successfully updated, then the lock proceeds to power down (822) without granting access. The lock also powers down (822) after a successful access (820). After the lock powers down, the key powers down and leaves the lock mode (814). The process ends when the key is removed from the lock (824).

Figure 9:
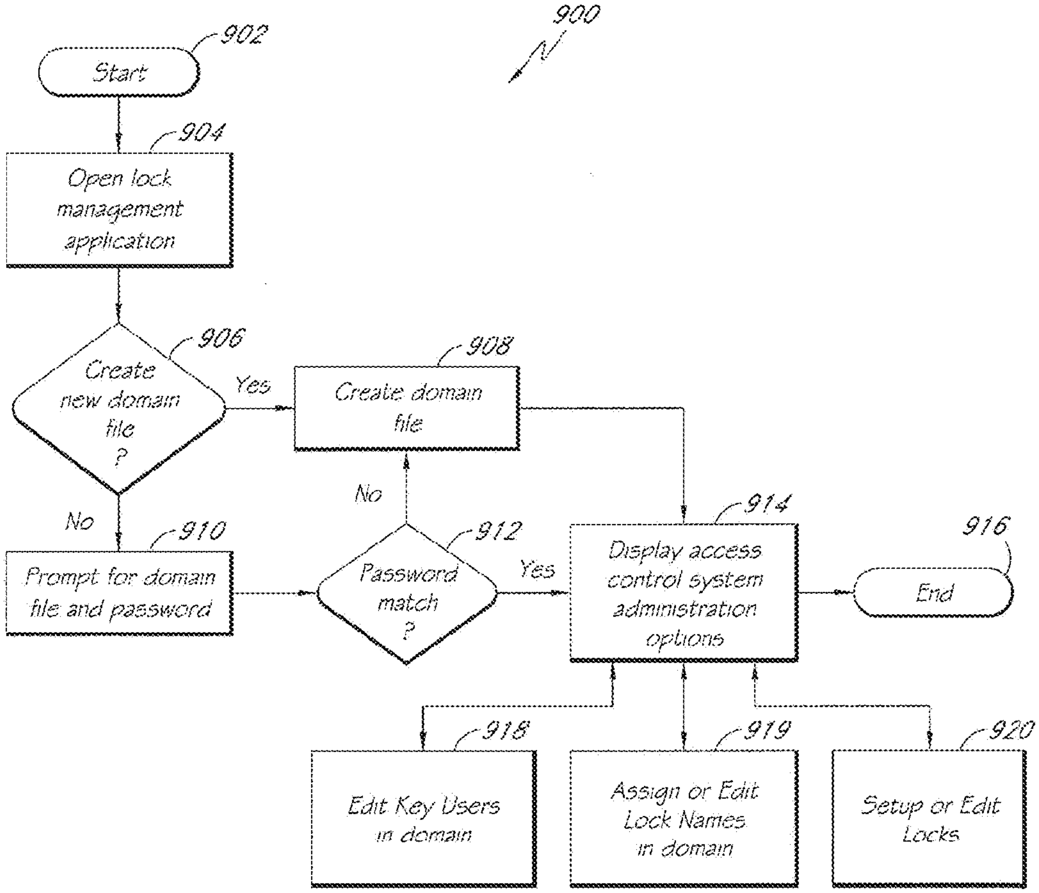
FIG. 9 is a flowchart of an embodiment of a method for configuring key access information in an access control system.

FIG. 9 is a flowchart of an embodiment of a method 900 for configuring key access information in an access control system. In some embodiments, the method 900 begins when a user inserts a key into a USB port of a computer system (902), or otherwise (e.g., via Near Field Communication (NFC) or wireless communication) causes the key to establish or initiate communication with the computer system. In some cases, the key may automatically establish or initiate communication with the computer system. For example, when the key is brought within a particular distance (e.g., Bluetooth® range) of the computer system, the key may initiate communication with the computer system. Next, an access control system management application (or admin application) is opened, either automatically upon insertion of the key, or other communication between the key and computer system, or upon an action of the user (904). The admin application determines whether a new domain file needs to be created (906). For example, the admin application may determine whether a domain file is stored on the key or may prompt the user to determine whether she will be creating a new domain. If a new domain file will be created, the admin application proceeds to create a new domain file (908). The domain file links lock configuration files, which contain key access information for individual locks, to alias names of the locks and links keys to alias key user names, which are interpreted by the admin application.

If a new domain file will not be created, the admin application attempts to open a domain file from the computer or from the key (910). In some embodiments, the admin application prompts the user to locate a domain file. The admin application may also search for one or more domain files in a location on the computer or on the key. The admin application may prompt the user to enter a password associated with the domain file, if any (912). If the password does not match, then the admin application can default to creating a new domain file (908). After creating a domain file or getting a password match, the admin application displays administration options for an access control system (914) and receives input from the user indicating what changes should be made to the domain file and/or lock configuration files. The changes can include, for example, assigning or editing locks in the domain (919), editing keys (such as, for example, slave keys or master keys) or key users in the domain (918) and other domain-specific key access information such as linking a public key identifier to a key user's alias name (918) and a lock identifier to a lock's alias name (919). In some embodiments, the domain file is a file that enables the admin application to manage and to link the lock configuration files for each lock (920). The lock configuration files contain key access information for each lock that determines what keys have access privileges for locks in the domain. Lock configuration files can also be used by the master key to program locks. In some embodiments, the access log is a separate file that can store the number of accesses, time of access, date of access, and optionally other access data. The access log can be stored in a memory of a lock and can be transferred to a file on a master key when the master key accesses the lock. Changes are written to the domain file and lock configuration files, and the process 900 ends when the domain file and/or lock configuration files are closed (916).

FIG. 10 illustrates an example embodiment of an interface 1000 for configuring key access information in a domain file. The interface 1000 includes a keys portion 1002 that shows a list of keys in a domain. A user can identify the keys by a key alias, by a public key identifier (Key_ID #), or by key type (master or slave). In some cases, the user may identify the keys by a lock alias and/or a key alias derived from a lock alias. The keys portion 1002 includes interface elements for adding keys to the domain, removing keys from the domain, changing the key type, and/or other functionality.

The interface 1000 also includes a locks portion 1004 that shows a list of locks in the domain. In some cases, there is no specific domain, and all locks accessible by a user may be shown for any domain. In other cases, locks may be shown for a set of one or more domains. A user can identify locks by a lock alias, by a lock identifier, or, optionally, by other lock properties. In some embodiments, the locks portion 1004 includes interface elements for viewing lock access logs, adding locks to the domain, removing locks from the domain, changing a lock alias, and/or other functionality.

The interface 1000 includes lock configuration file portions 1006, 1008 that show a list of keys that have access privileges for locks in the domain. The lock configuration file portions 1006, 1008 provide interface elements that allow a user to create and/or modify lock configuration files containing key access information for individual locks. The lock associated with each lock configuration file portion can be identified by lock identifier and/or lock alias. Each portion 1006, 1008 identifies keys that have access privileges for a lock by key alias, key type, other identifiers, and/or other lock configuration file properties. In some embodiments, the lock configuration file portions 1006, 1008 include interface elements for deleting key access privileges, adding key access privileges, updating a lock configuration file, and/or other functionality. Interface elements can include buttons, hyperlinked text, selection lists, pull-down menus, check boxes, text input boxes, radio buttons, etc.

In some embodiments, one or more applications, software, applets, or executable files may reside on a mass storage device of the electronic key described herein. This may advantageously allow users to have access to the lock configuration file and domain via a computing device (for example, a desktop or a laptop computer) without having a specific software application on the computing device. In some embodiments, the user interface application, software, applet or executable file may not reside on the mass storage device of the key.

In various embodiments, the lock configuration file can be a text file readable by common text editors or other applications, software, applet, or executable files that may be capable of editing texts, for example, a notepad software. Such applications, software, applets, or executable files may reside on user devices, for example, a laptop computer, a desktop computer, a mobile phone, a tablet, and the like, to allow users to view and edit the domain and lock files. The firmware in the electronic key described herein may read the lock file and update a key access database (KAD) in the lock with any changes associated with or identified in the lock file. Accordingly, locks may be configured without buttons and/or special application software.

In some embodiments, the lock configuration file may be stored in an electronic key. For example, as described herein, a master key may create and store a lock configuration file in its storage device. In some embodiments, when an electronic key (for example, a master electronic key) is connected to a computing device (for example, a desktop computer), the computer may receive the lock configuration file from the electronic key. Optionally or alternatively, the computer may access the lock configuration file, for example, from the electronic key and generate a copy of the lock configuration file and store it. Optionally, the computer may generate a file including information stored in the lock configuration file.

In some embodiments, an electronic lock may not be initialized. In some such cases, the electronic lock may not have provided access privileges to an electronic key. When an electronic key establishes communication with an electronic lock that has not been initialized, or that has not yet paired with or granted master key privileges to another electronic key, the electronic key may become the master key for the lock. As described herein, an electronic key may physically or wirelessly connect (via any suitable wireless communication protocol) to an electronic lock. In some embodiments, the electronic lock may provide its status (for example, not initialized) or lock public ID to the key. Upon receipt of the status or lock public ID, the key may generate a lock configuration file associated with the electronic lock (now initialized). If a subsequent electronic key that is not the master key accesses the electronic lock that is now initialized, the electronic lock may treat the subsequent electronic key as a slave key since the subsequent key does not have the lock configuration file associated with the electronic lock. In some embodiments, the lock configuration file may be named used a public ID of the electronic lock.

Once the lock configuration file has been created, it may be edited using, for example, a text-editing application or program. For example, the electronic key storing the lock configuration file may be connected to a computing device (for example, a desktop computer, a laptop computer, a tablet, a smartphone, a wearable computing device (e.g., a smartwatch or smart glasses), or the like). Once the electronic key is connected to the computing device, a user may use an application or a program to access and edit information stored in the lock configuration file. Such application or program may be a text-editing program as described herein, or a specially designed application configured to configure the electronic key and/or electronic lock. With such application or program, the user may be able to update or change the lock configuration file to edit (for example, add or remove) information associated with electronic keys granted access to the electronic lock.

In some embodiments, public key IDs (for example, storage volume name or serial number) may be accessed manually as described herein. For example, a user may connect an electronic key to a computing device to retrieve a public key ID (for example, a storage volume serial number). Once the public key ID has been retrieved, the user may edit the lock configuration file associated with an electronic lock (for example, one the user wishes to gain access to) to grant the electronic key an access privilege for accessing the electronic lock. Access privilege may be granted by adding a public key ID of an electronic key. In some examples, access privilege may be granted by adding a storage volume identifier or serial number instead. In some embodiments, the lock configuration file may be stored inside a storage unit of a master electronic key (for example, a master key of the electronic lock the user wishes to gain access to) as described herein and the master electronic key may be connected to a computing device for the user to access the lock configuration file. Once the lock configuration file is edited to add a public key ID of an electronic key, the electronic key may now have access to an electronic lock associated with the lock configuration file.

As discussed above, a lock of an electronic access system can share information to authenticate a key and provide access. As discussed herein, such information for authentication may be shared between the key and the lock via wireless communication or communication via physical connection between the key and the lock. However, such authenticating information may be intercepted and accessed by third-parties who may not be authorized to access the lock. Accordingly, it may be important to keep certain authenticating information (for example, private key ID) private from others to provide increased security. For example, when such authenticating information is transmitted wirelessly between the key and the lock, it may be possible that such authenticating information can be intercepted and gathered by a third party. In order to prevent such third party from having access to authenticating information stored in the key or the lock, it may be advantageous to provide a security scheme, method, or system to safeguard the authenticating information. In some examples, such security scheme, method, or system can utilize asymmetric or symmetric cryptography.

In some embodiments, the private key ID may be hashed, encrypted, or derived using various methods of cryptography. For example, a private key ID may not be stored within a storage unit of an electronic key. Instead, a private key ID may be generated for an electronic key per use. For example, when an electronic key is connected to an electronic lock or brought within a predetermined distance from the electronic lock, the electronic key may generate a private key ID. In some embodiments, the generated private key ID may be valid/stored/used for a single or multiple accesses/authentications. The private key ID may be generated based at least in part on a public key ID as described herein. The private key ID, in some examples, may be based on other information or parameters unique or not unique to the electronic key. For example, information such as, but not limited to, time (day, time, minutes, seconds, and the like) of access, time of manufacture, storage device serial number, and the like may be used in conjunction with the public key ID to generate the private key ID.

An electronic key can be an electronic device that includes a connection interface, a controller, a power source, and a storage device. In some embodiments, the controller may be a microcontroller that may include a storage device. The connection interface can any type of electronic, physical interface that allows transmission of data between the electronic key and another electronic device having a corresponding connection interface. Additionally or alternatively, the connection interface can allow transmission of power between the electronic key and another electronic device.

The connection interface can be or can include different types of interfaces including, but not limited to, USB 2.0, USB 3.0, Thunderbolt, Micro, Mini, Firewire 800, Firewire 400, SATA 1, SATA 2, SATA 3, eSATA, and the like. The connection interface can be formed on a housing of the electronic key. The connection interface of the electronic key can mate with a corresponding connection interface of an electronic lock to establish communication between the electronic key and the electronic lock. The connection interface of the electronic key can be dimensioned, shaped, or oriented to require the connection interface to be in a certain orientation to mate with the corresponding connection interface of the electronic lock or other electronic devices. For example, the connection interface can be coupled to a corresponding connection interface of a mobile device or a portable computer such as a tablet or a laptop computer.

In some embodiments, the connection interface can be a wireless transmitter that can establish communication with another wireless transmitter via different types of wireless communication protocols. For example, the wireless transmitter of the electronic key can utilize a near-field communication (NFC) or Bluetooth® to establish communication with the wireless transmitter of the electronic lock or other electronic devices.

The controller of the electronic key can communicate with the connection interface to receive data or power via the connection interface. The power source can include a battery that is coupled to the controller. The battery can be disposable or rechargeable. The power source can receive power received via the connection interface of the electronic key.

The storage device can be a physical device housed within the electronic key. In some examples, the storage device is an electronic server located at a remote location from the electronic key. The electronic key can include a storage device controller that can implement a file system to store data within the storage device. The storage device controller may be a separate controller or may be the same as the controller of the electronic key. Different file systems can be utilized for the storage device of the electronic key, including, but not limited to, NTFS, HFS+, APFS, FAT32, exFAT, EXT 2, EXT 3, EXT 4, and the like. By using a file system, the storage device controller can organize data on the storage device in a format compatible with an operating software of the electronic key, the electronic lock, or both. The file system can also be used to access information in files, such as the lock files, for example, lock configuration files stored in a storage device within, for example, an electronic key or an electronic lock.

In some embodiments, an electronic lock may have an operating system with a file system that can store, access, or retrieve information stored within a storage device within the electronic lock. In some embodiments, the lock does not have an operating system and a respective, corresponding file system.

The storage device can store different types of information specific to the electronic key, including, but not limited to, a public key identifier (public key ID), a private key identifier (private key ID), an alias of the lock, and/or an alias of the key. The storage unit of the electronic key can be a non-volatile memory. The storage unit can also be integrated in the key controller.

In some embodiments, the public key ID can be an identifier or a serial number generated and provided to the key during a manufacturing process and is typically not modifiable. Additionally or alternatively, any information, data, or identifier that publicly identifies the key can be used as a public key ID for the key. The public key ID may be user-generated. Alternatively, the public key ID may be automatically and randomly generated by the controller of the electronic key per each use. The public key ID may be stored within the storage device of the electronic key or in a secured, remote server at a remote location. The public key ID may be strings of alphanumeric characters. In some aspects, the public key ID may be generated from a private key ID using a one-way hashing algorithm or other algorithm that prevents the public key ID from being used to determine the private key ID.

Additionally, or alternatively, the public key ID can be used to publicly identify the key. For example, the public key ID can be a name of a volume or a partition of a storage device within the key. The name of the volume or the partition can be modified by a user. A user may connect the electronic key to another electronic device (for example, a desktop computer or a mobile telecommunication device) and communicate with a storage device controller of the electronic key to modify names of different volumes or partitions within the storage. This can advantageously allow users to access and modify the public key ID without having to download any software or applications.

In some instances, a public key ID of a slave electronic key may be changed over time. Nevertheless, in some such cases, the slave electronic key may retain its access privileges (that is, be able to access the same electronic locks after the change as the slave electronic key could access prior to the change of public key ID) even after changing its public key ID. For example, an electronic key (for example, electronic key A) may have a private key ID ("A87DJ3KR63") and a public key ID ("JOHN1234"). The public key ID of the electronic key A may be provided to a master key (for example, master key X) to provide access privileges for electronic key A for an electronic lock (for example, electronic lock A). However, as discussed herein, the public key ID may be changed at a later time. For example, the public key ID of electronic key A may change from "JOHN1234" to "JOHN5678."

In some cases, the change of the public key ID of electronic key A may not affect or change electronic key A's access privileges for electronic lock A. For example, when electronic key A is used to access the electronic lock A, electronic lock A may grant access to electronic key A based on electronic key A's private key ID ("A87DJ3KR63"), regardless of electronic key A's public key ID. Therefore, a change in electronic key A's public key ID may not affect the access privilege of electronic key A.

In some cases, public key IDs may be used for different functions. For example, a first electronic key ID may be used for authentication while a second electronic key ID may be used for adding or removing electronic keys. The shared key between electronic key A and electronic lock A may be based at least in part on the first electronic key ID (for example, electronic key A's serial number) which may not change, while adding and/or removing electronic keys, for example, from a lock file, may be based at least in part on the second electronic key ID (for example, electronic key A's storage volume number/name) which may change, for example, by a user input. As such, changing a volume name/number of an electronic key may not affect the master key's ability to change access privilege for accessing an electronic lock.

Optionally or additionally, a change of the public key ID of the electronic key (for example, electronic key A) may not affect the master key's (for example, master key X) ability to add or remove an electronic key (for example, electronic key A) from the master key's (for example, master key X's), for example, lock configuration file or domain file as described herein. For example, Master key X may store electronic key A's public key ID ("JOHN1234") for identification purposes. Electronic key A's public key ID may be associated with electronic key A. In some examples, the public key ID of electronic key A may be associated with any subsequent public key IDs (for example, "JOHN5678") of electronic key A. Accordingly, even if the public key ID of electronic key A is changed from "JOHN1234" to "JOHN5678," master key X may still identify the electronic key A using the public key ID information, for example, "JOHN1234," it has for the electronic key A. As such, master key X may be able to add or remove electronic key A from its lock configuration file or domain file.

While the public key ID may publicly identify the electronic key, the private key ID may remain unknown to others. Additionally or alternatively, the private key ID may be unknown to a user of the electronic key. In order to keep the private key ID private, the private key ID may not be accessible or modifiable. As such, the private key ID may remain unique and secret. This can advantageously prevent unauthorized users from accessing and modifying the private key ID of an electronic key to gain access to electronic locks without being authorized or being added as one of authorized users as described herein. The private key ID may be stored within the storage device of the electronic key or in a secure, remote server at a remote location. The private key ID may be strings of alphanumeric characters. In some cases, the private key ID may include non-alphanumeric characters or symbols.

In some embodiments, a private key ID may never be stored within an electronic key. A private key ID, for example, may be generated or determined when an electronic key is coupled to an electronic lock requesting access. This may advantageously prevent others from accessing the private key ID since it is not stored anywhere. The generated private key ID may be used to grant access (for example, unlock the electronic lock). In some embodiments, the generated private key ID may be used (for example, decrypted) to determine an identifier that may uniquely identify the electronic key. As such, the electronic lock may use such unique identifier to grant or deny access. In the above example, a private key ID may be generated using various information unique to the electronic key or the electronic lock, such as lock serial number, key serial number, key volume number, etc.

The public key ID and the private key ID can be stored within a specific location of the storage device of the electronic key. The public key ID can include a portion indicating a location within the storage device where the public key ID is stored. Such portion can be a location identifier. The private key ID can include a location identifier that can identify where it is stored. In some embodiments, however, the private key ID may not have such portion indicating a location with the storage device. This can advantageously prevent others, including unauthorized users, from accessing, modifying, or copying the private key ID. The private key ID may be stored in a secure location of the storage device that is not useable for general storage or for storage of other data. In some cases, the private key ID may be stored in a separate secure storage device or register that is separate from the storage device within the key that may be used to store the public key ID or other data. In some embodiments, the private key ID can be stored within a randomized location of the storage device of the electronic key. After each use of the electronic key, the location of the private key ID can be changed to a random location of the storage device. This can advantageously prevent unauthorized users from accessing, modifying, or copying the private key ID.

Additionally, the electronic lock can include a public lock ID and a private lock ID. The public lock ID can publicly identify the electronic lock. The public lock ID may be generated by a manufacturer or by a user. The public lock ID can be modifiable. The public lock ID can be used as the file name of a lock configuration file 1006. Alternatively, or in addition, the public lock ID may be a serial number unique to the electronic lock. In some embodiments, the electronic lock can include a storage device that can have a number of volumes or partitions. As described herein, names of volumes or partitions in such storage device can be used as a public ID for the electronic lock. Such a public lock ID may be modified by coupling the electronic lock to a computing device (e.g., a desktop or laptop computer, a mobile communication device, a tablet, or the like) and communicating with a storage device controller that can rename the names of the volumes or the partitions. The private lock ID can uniquely identify the electronic lock. In some embodiments, the private lock ID, similar to the private key ID, is not accessible or modifiable. The private lock ID can remain unknown to the user of the electronic lock. The public lock ID and the private lock ID may be strings of alphanumeric characters.

The electronic lock can include a storage unit that can store the public lock ID and the private lock ID. The storage unit of the electronic lock can be a non-volatile memory. The public lock ID can include a device information portion that can be used to identify the electronic lock and a location identifier can be used by a controller of the electronic lock to locate the device information. The private lock ID can include a device information portion that uniquely identifies the private lock. In some examples, the private lock ID can additionally include a location identifier used to locate the private ID within the storage device. Such location identifier of the private lock ID may remain private and unknown to prevent unauthorized users from accessing the device information of the electronic lock.

In a non-limiting example, the electronic key may couple with the electronic lock and transmit the private key ID to the electronic lock. Once the private lock receives the private key ID, it can compare the private key ID to a list of key identifiers associated with electronic keys authenticated to access the electronic lock. The list of key identifiers can be stored within a storage device in the key access database of the lock housed within the electronic lock or stored in a remote, secure server. The list of key identifiers associated with authenticated electronic keys may be encrypted using information known only to the electronic lock. Such information can be a private lock ID. Once the electronic lock finds a match between the private key ID and the list of authorized key identifiers, it can grant access to the electronic key. However, the above non-limiting method may not be secure since the electronic key transmits the private key ID to the electronic lock. As discussed herein, such transmission of the private key ID can cause the electronic lock and key system described herein less secure since unauthorized users may be able to access the private key ID during communication between the electronic lock and the electronic key. This can be especially true in situations where the transmission of the private key ID occurs wirelessly.

Figure 11:
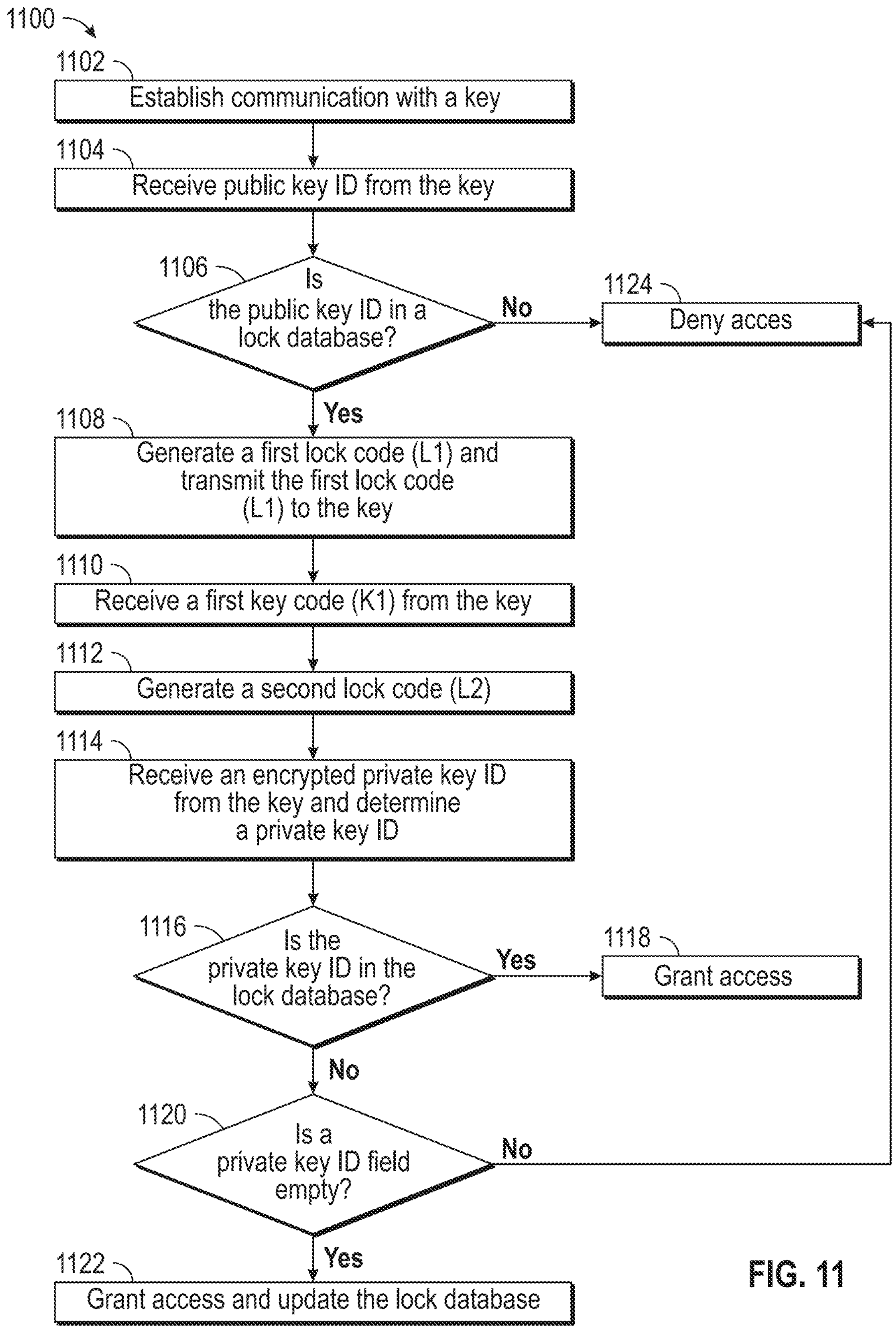
FIG. 11 is a flowchart of an embodiment of another method of operation of an electronic access control system.
Figure 12:
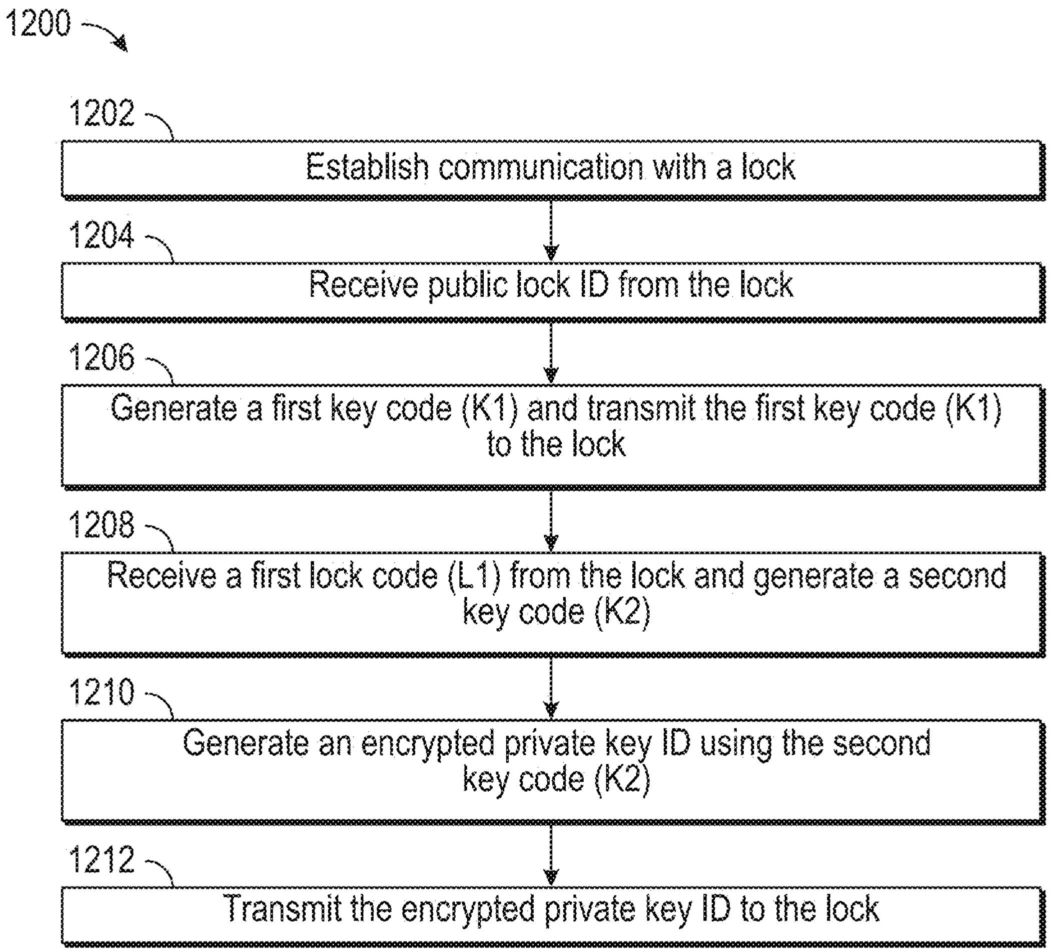
FIG. 12 is a flowchart of an embodiment of a method of transmitting information between a lock and a key of an electronic access control system.

An encryption/decryption scheme or system to can be used to authenticate the electronic key without transmitting the private key ID between the electronic key and the electronic lock. FIGS. 11 and 12 describe a non-limiting, example method of using private key ID, public key ID, public lock ID, and private lock ID to authenticate the electronic key. FIG. 11 shows an example method 1100 of authenticating an electronic key. At block 1102, an electronic lock can establish communication with an electronic key. As discussed above, the connection between the electronic lock and the electronic key can be wireless. The wireless communication between the key and the lock can be established via different types of wireless communication protocols including, but not limited to, Bluetooth®, near-field communication (NFC), Wi-Fi, and the like. Additionally or alternatively, the communication between the electronic lock and the electronic key can be established via corresponding connection interfaces (for example, USB 2.0, USB 3.0, Thunderbolt, Micro, Mini, Firewire 800, eSATA, and the like) of the electronic lock and the electronic key. In some embodiments, the communication between connection interfaces of the electronic lock and the electronic key can be established via a cable assembly suitable to mate with the connection interfaces.

At block 1104, the electronic lock can receive a public key ID from the electronic key. The controller of the electronic key can retrieve the public key ID from the storage device (of the electronic key) and transmit the public key ID to the electronic lock via the communication link established between the lock and the key. Once the electronic lock receives the public key ID, a controller of the lock can check if the public key ID matches an identifier stored at a non-volatile memory associated with the lock at block 1106. The memory (or storage device) may include one or more identifiers associated with electronic keys that are authorized to access the lock. The nonvolatile memory may be included in the lock or in a remote system. Further, the block 1106 may include comparing the public key ID to one or more identifiers stored at the non-volatile memory associated with the lock. In some cases, the one or more identifiers are stored in a database or other data structure configured to store one or more public key IDs, or other identifiers associated with one or more keys. The database can be stored within the lock or at some remote location. The database can be located within a server located at a remote location. The database of the lock may be accessed and/or modified by different users. Access and modification of the database of the lock may depend on a level of authentication for each user. The database can include one or more public key IDs and one or more corresponding private key IDs.

Once the controller of the electronic lock determines that there is a match between the public key ID of the electronic key and an identifier stored in the storage device of the electronic lock, the lock can generate a first lock code (L1) at block 1108. The first lock code may be unique. The first lock code can be generated using at least the private lock ID and the public lock ID. The first lock code can be generated using different types of encryption methods including, but not limited to, triple data encryption standard (DES) algorithm, Rivest-Shamir-Adleman (RSA), Blowfish, Twofish, Advanced Encryption Standard (AES), and the like.

At block 1110, the electronic lock receives a first key code (K1) from the key. The first key code can be generated using a public key code or a private key code. In some examples, the first key code can be generated using both the public key code and the private key code. The first key code can be generated using different types of encryption methods including, but not limited to, triple data encryption standard (DES) algorithm, Rivest-Shamir-Adleman (RSA), Blowfish, Twofish, Advanced Encryption Standard (AES), and the like.

The first lock code (L1) and the first key code (K1) may be the same or different. The first lock code (L1) and the first key code (K1) can comprise one or more alphanumeric characters. Prior to the exchange of the first key code (K1) and the first lock code (L1), the codes (e.g., K1 and L1) can be generated and stored. In some embodiments, the codes (e.g., K1 and L1) can be stored in a non-volatile memory. Additionally or alternatively, the codes (e.g., K1 and L1) can be stored within a volatile memory such that the first key code (K1) and the first lock code (L1) may be removed from the volatile memory after a certain period of time. This can be advantageous in preventing others from accessing the electronic key or the electronic lock to access the first key code (K1) or the first lock code (L1) and determine the private key ID or the private lock ID using the first key code (K1) and the public key ID.

Once the first lock code (L1) and the first key code (K1) are swapped between the electronic lock and the electronic key, the codes (e.g., L1 and K1) may be stored in a non-volatile or volatile memory for future use. For example, once the first key code (K1) is transmitted from the electronic key to the electronic lock, the controller of the electronic lock may store the first key code (K1) within the storage device of the lock. The swapped codes can be stored and saved for a predetermined period of time or indefinitely. In some embodiments, the swapped codes can be encrypted prior to being stored.

At block 1112, the lock generates a second lock code (L2). The second lock code (L2) can be generated using at least the first key code (K1) or the private lock ID. In some examples, the second lock code (L2) is generated using the first key code (K1) and the private lock ID. Although the first key code (K1) may be made available or accessible to unauthorized users, the private lock ID can remain unknown and inaccessible to others, including the user. In this regard, the second lock code (L2) can remain secure and unknown. The second lock code (L2) can be generated using any of encryption methods described herein.

The electronic key can generate a second key code (K2) using at least the first lock code (L1) or the private key ID. In some example, the second key code (K2) is generated using the first lock code (L1) and the private key ID. Since the private key ID remains unknown and inaccessible, the second key code (K2) can remain unknown. Even if unauthorized users intercept or access the first lock code (L1) transmitted from the lock to the key, the unauthorized users may not be able to determine the second key code (K2) since the private key ID is unknown.

In some embodiments, the second key code (K2) and the second lock code (L2) are the same. The second key code (K2) and the second lock code (L2) can be a secret code shared (for example, a shared secret) between the electronic lock and the electronic key, and may be unknown to others since they are generated using the private key ID and the private lock ID. The second key code (K2) may be used to generate an encrypted private key ID. Any suitable encryption methods described herein may be utilized to generate the encrypted private key ID.

Both the second lock code (L2) and the second key code (K2)—used to generate the encrypted private key ID—may be stored within the storage devices of the electronic lock and the electronic key, respectively. The storages device may be volatile or non-volatile.

At block 1114, the electronic lock receives the encrypted private key ID from the electronic key. The lock can decrypt the encrypted private key ID using the second lock code (L2) and determine the private key ID. As discussed herein, the second lock code (L2) and the second key code (K2) can be the same, secret shared code between the lock and the key. Accordingly, the lock can receive the encrypted private key ID from the key and use the secret shared code (e.g., second key code (L2)) to decrypt the encrypted private key ID to determine the private key ID. Different types of decryption methods can be used to determine the private key ID from the second unique code. The decryption methods can include, but not limited to, ideal observer decoding, maximum likelihood decoding, minimum distance decoding, syndrome decoding, partial response maximum likelihood, Viterbi decoder, and the like. The description method may be the same as the encryption method used for generating the encrypted private key ID.

At block 1116, after the lock determines the private key ID, it checks to determine if the private key ID is in a database (for example, key access database (KAD) as described herein). At block 1118, if the private key ID is in the database, the lock allows access. However, at block 1120, if the private key ID is not in the database, then the lock determines whether private key ID field for the database is empty. In other words, the lock determines whether the database does not have any private key IDs. At block 1122, if the private key ID field of the database is empty, then the lock allows access and updates the database to add the private key ID determined from the second unique code. At block 1124, if the private key ID field of the database is not empty, then the lock powers down. In some embodiments, the process of adding the private key ID (of an electronic key) when the private key ID field of the KAD is empty, for example, as described herein, may include one or more of the embodiments described with respect to the analysis 806 of the method 800 shown in FIG. 8. In some embodiments, the process of adding the private key ID when the private key ID field of the KAD is empty may include one or more embodiments described with respect to the method 200 shown in FIG. 2.

FIG. 12 illustrates a method 1200 of sharing private key ID between the key and the lock. As discussed herein, it is advantageous to not to directly share the private IDs of the key or the lock to ensure that those IDs remain private. At block 1202, the key can establish connection with the lock. As discussed above, the connection between the lock and the key can be wired or wireless. The wireless communication between the key and the lock can be establish via different types of wireless communication protocols including, but not limited to, Bluetooth®, near-field communication (NFC), Wi-Fi, and the like.

At 1204, the key receives the public lock ID from the lock. The transmission of the public lock ID from the lock to the key can occur manually or automatically after connection is established between the key and the lock. Instead of a public lock ID, any information, data, or identifier (for example, a public ley ID) can be used instead.

At block 1206, the key generates a first key code (K1) and transmits the first key code (K1) to the lock. The first key code (K1) can be generated based at least on one publicly available data and at least one private data. The publicly available data may be a public lock ID or a public key ID. Any data known between the lock and the key may be used to generated the first key code (K1). The private data may be the private key ID or some other data and/or information that may be unique or not unique for the electronic key. For example, the key may generate the first key code (K1) using the private key ID and public lock ID. The public key ID and public lock ID may be available to both the key and the lock when communication is established therebetween.

At block 1208, the key receives a first lock code (L1) from the lock and generates a second key code (K2). The second key code (K2) can be generated using at least the first lock code (L1) and the private key ID. In this regard, the second key code (K2) remains secure since private key ID is kept secure and not shared with any users or devices. The blocks 1206 and 1208 can occur simultaneously. At block 1210, the key can generate an encrypted private key ID. The encrypted private key ID can be based on the private key ID and the second key code (K2). Since the second key code (K2) is generated using the private key ID as discussed above, the encrypted private key ID generated using the second key code (K2) can also be secure. At block 1212, the key transmits the encrypted private key ID to the lock for authentication.

The key and the lock described herein can be programmed using a mobile computing device, application, a mobile platform, computing device. The key can, as discussed herein, have a specific serial number and/or a volume name as its public key identifier. The volume name or the serial number may be generated and stored in a text file accessible by users via a word processing applications. The text file storing the volume name or the serial number may be accessed or modified via other suitable applications or other means. The volume name can be a name of an electronic storage located within the key per mass storage device specifications. The public key identifier of the key can be added to a list of keys within a database (for example, lock configuration file) via, for example, an application of a mobile device. The database (for example, lock configuration file) including a list of keys having access privileges can be located within a remote server or stored on the key as a text file.

The electronic key can be associated with one or more electronic locks using the mobile application. The mobile application can allow one or more keys to have access to a given electronic lock. In some aspects, the mobile application can establish wireless communication with an electronic lock to provide a list of keys that can access/operate the electronic lock. It is understood that various different types of wireless communication protocols can be established between a mobile device running the mobile application and an electronic lock including, but not limited to, near-field communication (NFC), Bluetooth®, Wi-Fi, and the like. The wireless communication between the key and the lock described herein can allow the lock to generate power from the wireless communication. For example, the key and the lock described herein can communicate via NFC and the NFC can allow the lock to generate power from NFC wireless signal.

In some embodiments, the electronic lock can include a list of authenticated electronic keys that can access the lock. The list of keys can be stored within a data storage device within the lock or in a remote database. The list of keys can be stored within a remote server such that it can be accessed with a mobile device that has access to the list of keys.

Users of an electronic lock or an electronic key can establish a user account. The user account can be associated with the electronic lock or the electronic key. The user account can store information associated with the electronic lock or the electronic key. In some examples, the information associated with the electronic lock or the electronic key can be stored at a remote server and the user account may be able to send a request to the remote server to access the information associated with the electronic lock or the electronic key.

An electronic lock or an electronic key may be added to a user account using various methods. A user may access his or her user account and manually add his or her electronic lock or key to his or her user account by associating the user account with identifying information of the electronic lock or key. The identifying information may be public key identifier or public lock identifier. In some examples, information related to the electronic lock or key may automatically be associated with the user account. A mobile application may be used to automatically access and retrieve identifying information from the electronic lock or key once the mobile application establishes communication with the electronic lock or key. A mobile application may be operated using computing device such as a desktop computer, laptop computer, a mobile communication device, tablet, or the like suitable to establish physical connection (e.g., via cable or communication interface) or wireless connection with the electronic lock or key.

Each user account can be associated with one or more electronic locks or keys. In some embodiments, an electronic lock associated with a first account can be associated with an electronic key associated with a second account. The information of the key associated with the second account can be provided to the first account associated with the lock and such information can be used to authenticate the key associated with the second account with the lock associated with the first account. The method of authenticating the key of the second account for the lock of the first account can include the first account requesting information of the key of the second account. Once the first account associated with the lock receives information of the key (e.g., a public key identifier of the key or a private key identifier of the key) from the second account, the first account can use the information to authenticate the key of the second account. In this regard, a user account can include a first list of electronic locks and keys associated with a user, and for each electronic lock in the first list, a second list of electronic keys authenticated to access the electronic lock.

For example, John can have his user account which can include a key and a lock. John can authenticate Kate's key to have access to his lock. In this regard, John's user account can not only include information associated with his own lock and key, but also include information associated with Kate's key, including, but not limited to, a public key identifier of Kate's key, a public key identifier of Kate's key, or both.

Once the information of Kate's key is added to John's user account, it can be modified. For example, John may be able to create an alias for Kate's key. Such alias may be the same or different from the key's public key identifier that may be generated by Kate. Kate may use "ABCD" as her key's public key identifier and John may use "Kate's key" as an alias for Kate's key.

Users may also be able to remove an authenticated key from their accounts. In the example above, John may remove Kate's key from his account. Removal of Kate's key may remove or disable authenticated status of Kate's key. Therefore Kate's key may no longer be able to access John's lock. As described herein, users may add one or more keys as authenticated keys for their locks. For example, John may add Kate's and David's keys as authenticated keys having access to John's lock. By having their keys associated with John's lock, Kate and David may now have access to John's lock.

In some embodiments, only a user (e.g., an owner) of a lock may add authenticated keys (or authorized keys) to grant access to the lock. This can prevent unauthorized users from granting themselves access to locks of other users without permission. In some other embodiments, the user of the lock can generate and provide a secure link, message, or any other suitable medium that can grant owners of electronic keys access to the lock.

In some embodiments, a user may be able to determine locations of locks associated with the user's user account. A user may also be able to determine locations of keys that are authenticated to access his locks. Information of the authenticated keys can include public key identifiers or descriptions provided by their respective owners.

The list of keys or locks (including authenticated keys) may be displayed in a tabulated format or in a graphical format overlaid with a map to show locations of the keys when available.

The user account may not show private IDs of the locks it is associated with. This is advantageous in preventing wrongful access of private lock IDs used to authenticate keys using methods and/or system discussed above. Private ID of the keys and the lock can remain unknown to users for security purposes.

The user account may be accessed via various types of devices including, but not limited to, a desktop computer, a laptop, a mobile phone, a smartphone, a tablet, and the like. In some embodiments, an application installed on a device may be used to access user accounts. The device used to access a user account may additionally be used as a key. For example, a smartphone may be used as to access a user account to, for example, view a list of keys authorized to access a lock and also as a key to access the lock. A smart phone or any mobile computing device may be used for authentication and access the lock.

The user account can be associated with one or more users. Users may or may not have the same level of access to the information associated with the user account. For example, a first user may access all information regarding locks and which keys are authorized to access which of the locks. The first user, in addition, may be able to view and change a list of keys authorized to access a lock. In contrast, a second user may have a lower level of access and may be able to merely view the list of keys authorized to access the lock and not to change the list of keys. In other examples, the first user may be able to access, view, and change a list of keys authorized for all of the locks associated with the account while the second user may be able to access, view, and change a list of keys authorized for a subset of the locks associated with the account. In other examples, the first user may be able to add and remove a key to a list of authorized keys for a lock while the second user may only be able to remove a key from the list of authorized keys.

The user account can include a master user that can change access level of other users. The master user can be changed to allow another user or other users to become master user(s). The master user may be able to add other users and grant them access to the user account. The examples of different levels of access for a user account and a list of keys discussed above are merely for an example and do not limit the scope of the disclosure in any way. It is understood that other variations of different levels of access of a user account is possible.

Figure 13A:
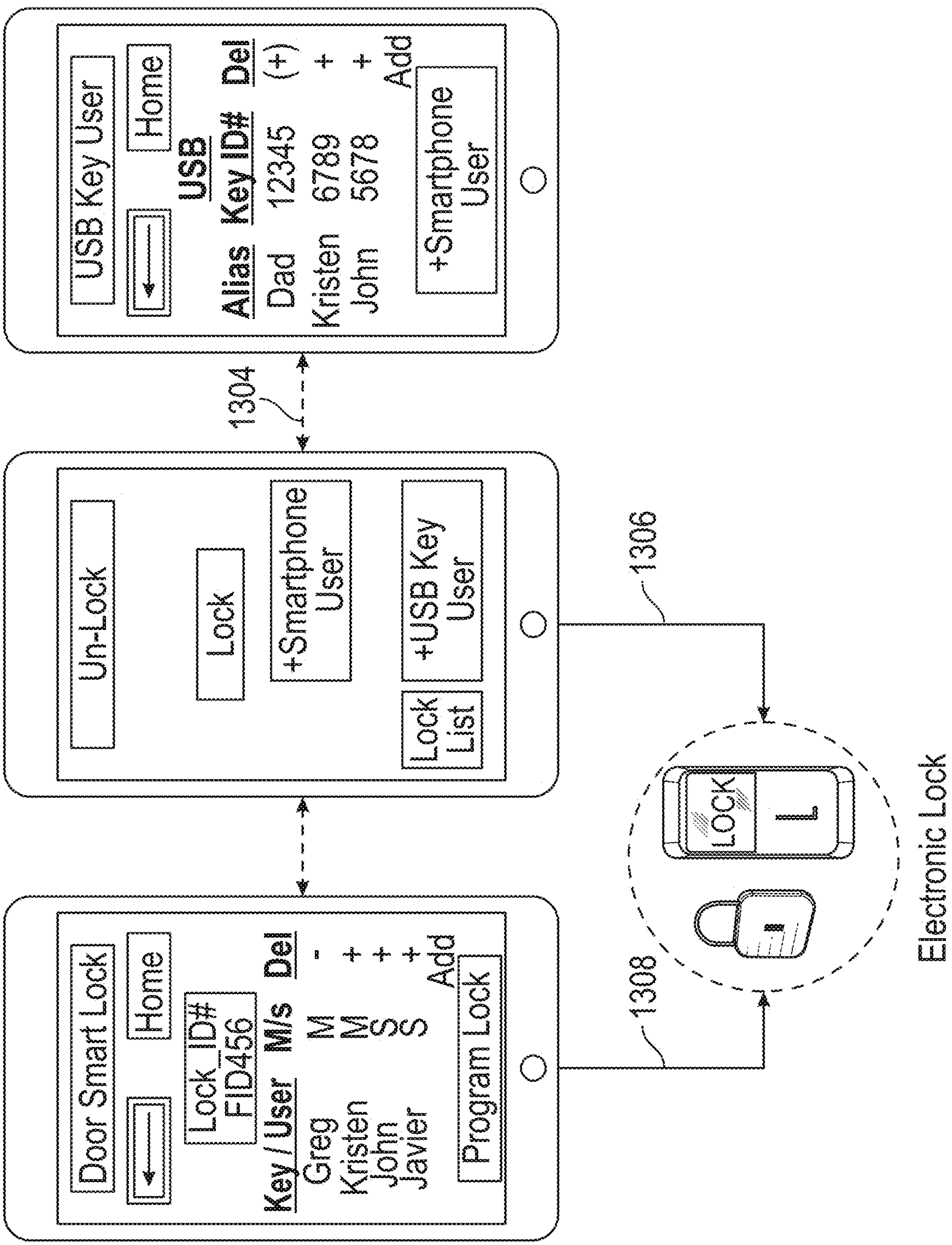
FIGS. 13A and 13B illustrate an embodiment of an electronic access control system.
Figure 13B:
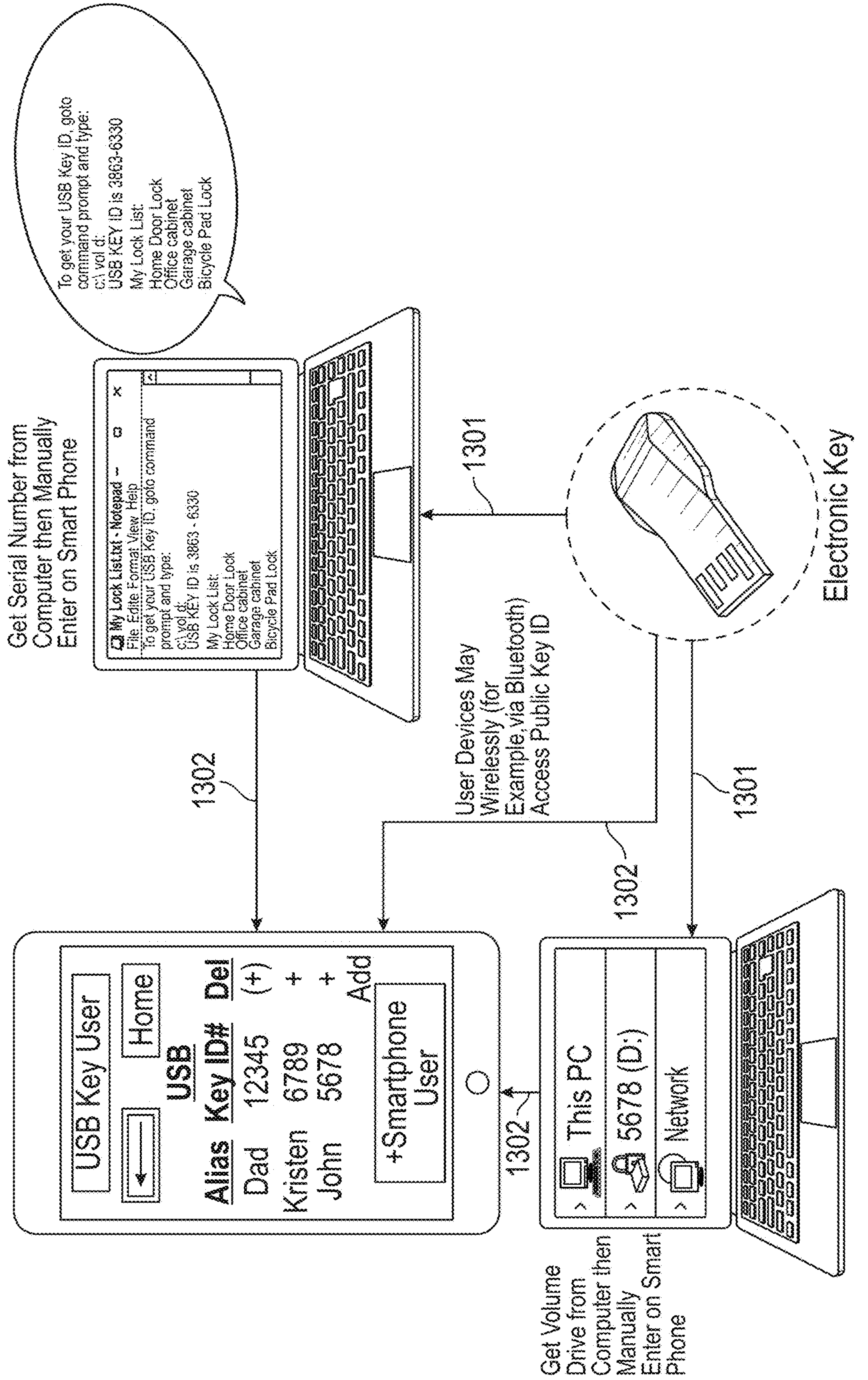

FIG. 13 illustrates a schematic dataflow diagram illustrating a flow of data between electronic keys, electronic locks, computing devices, and a mobile application associated with the computing devices. As discussed above, the electronic key can include an electronic storage device that can store different types of files. The electronic key can include a public key ID and a private key ID that uniquely identifies the key. While the public key ID can be accessible to users and locks, the private key ID may not be accessible and remain secret to ensure integrity of authenticating the key.

At block 1301, the electronic key can be connected to another computing device (for example, a PC or a laptop). At block 1302, the electronic key can be connected to, or in communication with, another electronic device (for example, a mobile device) used for access control. As discussed herein, the communication can be established via a physical connection or via a wireless communication protocol using wireless communication interfaces. For wireless communication, suitable short-range or long-range wireless communication protocols may be utilized, including, but not limited to, Bluetooth®, Z Wave, ZigBee, near-field communication (NFC), Wi-Fi, and the like. For physical connection, various suitable connection interfaces described herein may be utilized. In order to establish a physical connection between the electronic key and another electronic device, a compatible set of connection interfaces may be needed between the devices. In some embodiments, the electronic key can be used to access an electronic lock and a computing device (for example, a PC or a laptop).

Once connected, files that can be stored in the electronic key, and the public key ID, can be accessed, viewed, or modified via an application operable on an electronic device (e.g., a desktop computer, laptop computer, a tablet, or other computing device). A processor of the electronic device can, via the application, query or attempt to access the public key ID from the electronic key. In some embodiments, the electronic key automatically transmits the public key ID to the electronic device via the application. On the other hand, as discussed herein, the private key ID may not be accessed, viewed, or modified by the application or transmitted by the electronic key.

In some embodiments, the public key ID may be manually accessed by or provided to a user. For example, a user may access a public key ID of an electronic key by connecting the electronic key to a computer. Once connected, the computer may access the electronic key and the user may be able to view the public key ID (of the electronic key). As described herein, the public key ID may be a volume name of a storage unit of the electronic key. The user may copy the public key ID and manually enter it in a lock configuration file associated with an electronic lock the user wishes to access. Once the public key ID is added to the lock configuration file, the user may access the electronic lock. In some embodiments, as described herein, the computer may automatically identify the public key ID of the electronic key once the electronic key is connected to the computer.

A user may identify the public key ID by coupling the electronic key to a computing device (e.g., a desktop or laptop computer). The computing device can display the public key ID and allow the user to manually enter the public key ID to an application operating on either the same computing device or another computing device (e.g., a mobile communication device or a tablet). In some examples, a user may establish communication directly between a mobile computing device and the electronic key to query the public key ID. Establishing communication between the mobile computing device and the electronic key can automatically cause an appropriate mobile application to query and receive the public key ID from the controller of the electronic key. In some examples, querying and receiving the public key ID occurs manually.

At block 1304, the public key ID can be added to a user account. The user account can be accessed via an application installed on a user device or having a web-based network interface. Once the user account is accessed, users can add or remove the public key ID to the user account. The public key ID can be displayed with or without an alias (for example, "dad" or "mom") based on user preferences. The public key ID can be added to a list of keys having access for a specific lock. The list of keys having access to the lock can be used as a reference database for the lock when authenticating a key.

In some embodiments, the electronic key, once authenticated by the electronic lock, allows a user to access the electronic lock (e.g., open the lock). In some other embodiments, the electronic key, once authenticated, can actuate a locking or an unlocking mechanism of the electronic lock to allow a user of the electronic key to access the lock.

The mobile application can allow users to view or change settings for a given lock for which the users are authorized to access or program. The mobile application can have an interface that includes a lock button and an unlock button that, when triggered, allow users to lock and unlock the lock, respectively. Additionally, the mobile application can allow mobile computing devices such as a smartphone or tablet, for example, to be used as a key. For example, the mobile application can use a wireless communication device (including, but not limited to, NFC or Bluetooth®) of a mobile device to wirelessly communicate and authenticate using systems and methods described above.

At block 1306, the mobile application can be used to remotely unlock an electronic lock. At block 1308, the mobile application can be used to program an electronic lock and/or unlock an electronic lock. In some embodiments, the programming of the electronic lock and unlocking of the electronic lock can occur simultaneously. A mobile phone with the mobile application may not need to be within a predetermined range to access an account associated with a given key and authenticate the account or the key. In this regard, authentication may occur wirelessly via different wireless communication protocols including, but not limited to, Code Division Multiple Access (CDMA), Global System for Mobile Communication (GSM), 3G cellular network, 4G Long-Term Evolution (LTE), Long-Term Evolution Advanced (LTE-A), Wi-Fi, Bluetooth®, BLE, Z-Wave, or any other protocols that allow wireless transmission of data.

Figure 14A:
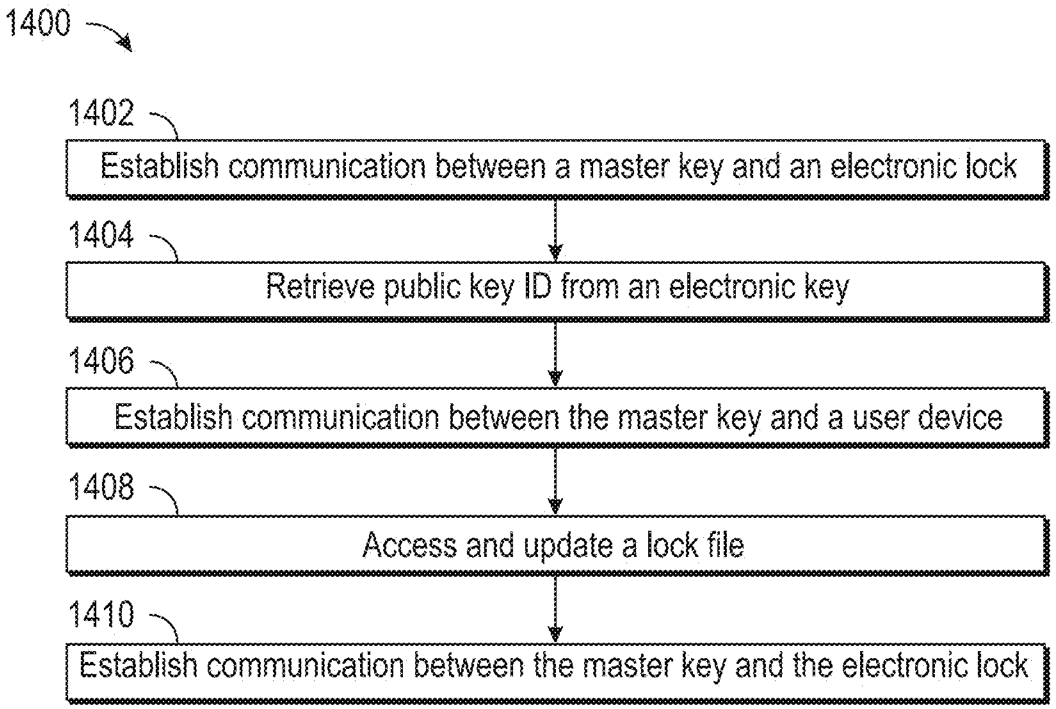
FIG. 14A is a flowchart of an embodiment of a method for granting access to an electronic lock.

FIG. 14A illustrates an example embodiment of a method 1400 of providing access to an electronic key for an electronic lock. At block 1402, communication between a master key and an electronic lock is established. In some cases, a communication between a master key and an electronic lock may be physical coupling. For example, the electronic lock may include a USB connector and the master key may include a corresponding USB connector that may allow a physical coupling between the master key and the electronic lock. When the communication is established between a master key (for example, a first electronic key coupled to an electronic lock) and an electronic lock, a lock file may be generated and stored within a storage unit of the master key. Additionally and/or optionally, when the communication is established between the master key and the electronic lock, the master key may be added to the electronic lock's KAD.

At block 1404, a public key ID is retrieved from an electronic key (for example, John's electronic key) different from the master key. In some cases, the public lock ID may be retrieved by establishing a communication between an electronic key and a user device (for example, a desktop computer, a laptop computer, a smartphone, a tablet, and the like). For example, John's electronic key may be connected to a laptop computer, and the laptop computer may display a volume name or a volume number associated with John's electronic key. As described herein, the volume name (or the volume number) may be a public key ID of John's electronic key.

At block 1406, communication between the master key and a user device (for example, a desktop computer, a laptop computer, a smartphone, a tablet, and the like) may be established. At block 1408, once communication is established, user may be able to access the lock file stored within a storage unit of the master key and update the lock file, as described herein. The lock file may be a text-based file that can be edited using a text-editing application or software. As described herein, the lock file may contain a list of electronic keys that have access to a given electronic lock. The lock file can be edited to add or remove an electronic key from the list, thereby editing who has an access to an electronic lock. For example, John's electronic key may be added to the lock file by adding the public key ID of John's electronic key.

At block 1410, communication between the master key and the electronic lock from block 1402 is established. The communication between the master key and the electronic lock may cause an automatic update of the electronic lock's KAD. For example, if the lock file has been edited to add, for example, John's electronic key with a public key ID of "5678," the electronic lock's KAD may be updated to include John's electronic key as one of electronic keys having access to the electronic lock.

Figure 14B:
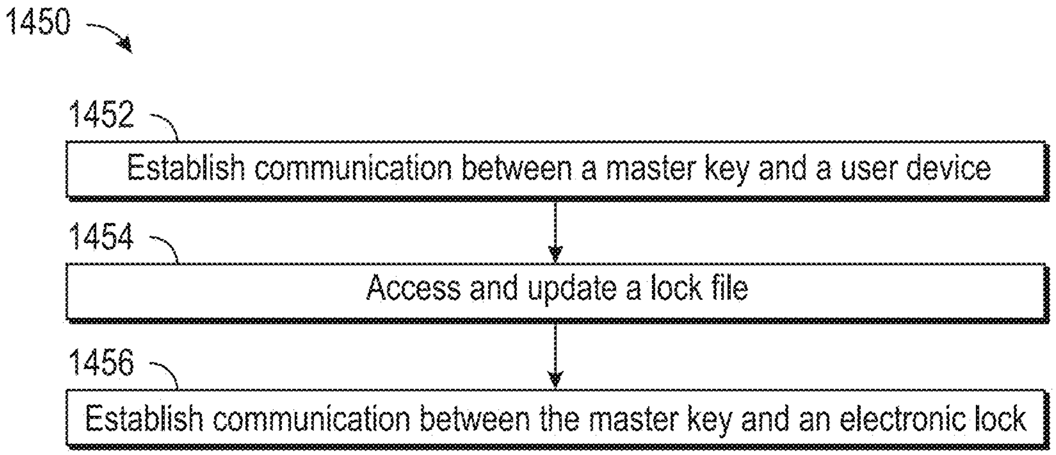
FIG. 14B is a flow chart of an embodiment of a method for removing access to an electronic lock.

FIG. 14B illustrates an example embodiment of a method 1450 of removing access granted to an electronic key. At block 1452, communication between a master key and a user device is established. As described herein, a master key may store a lock file that may be specific to a certain electronic lock. A user may be able to access the lock file via the user device and edit the lock file. At block 1454, the lock file is updated. As described herein, the lock file may be edited to add or remove an electronic key (for example, John's electronic key). For example, John's electronic key may be removed from the lock file by removing a public key ID associated with John's electronic key (for example, "5678") from the lock file. At block 1456, communication between the master key and an electronic lock is established. The communication between the master key and an electronic lock may cause an automatic update of the electronic lock's KAD. For example, the electronic lock's KAD may be automatically updated to reflect the removal of John's electronic key from the lock file.

Figure 15:
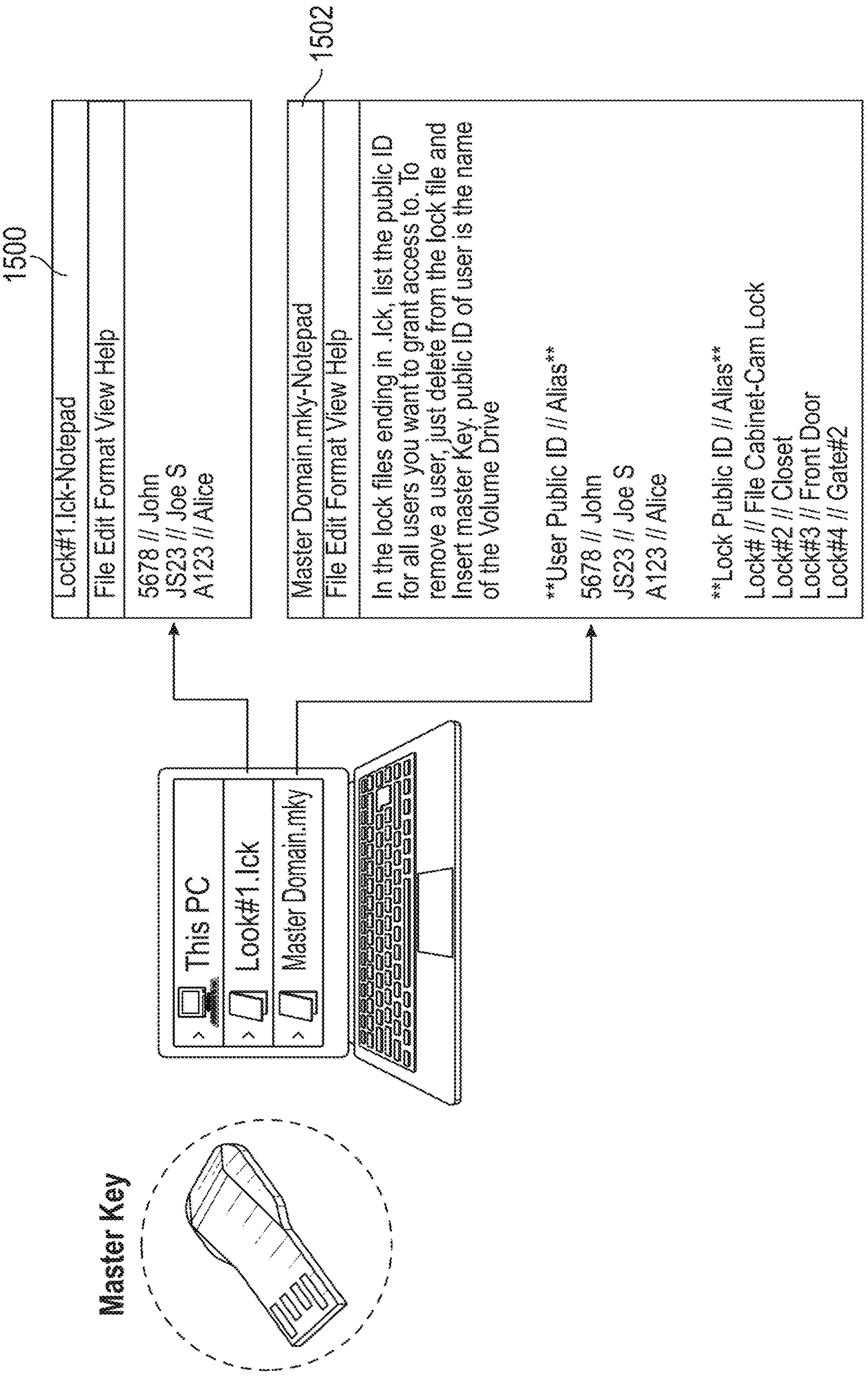
FIG. 15 illustrates example embodiments of graphical interfaces for editing a lock file and a master domain file.

FIG. 15 illustrates example embodiments of graphical interfaces 1500 and 1502 for editing a lock file and a master domain file, respectively. As described herein, the lock file may contain a list of electronic keys that have been granted access to an electronic lock. The lock file may have a name, for example, "Lock #1" as shown in an example illustrated in FIG. 15. In some cases, the name of the lock file may be a public ID for an electronic lock. Additionally and/or optionally, the lock file may display corresponding alias for each electronic key public key ID. The master domain file may include a list of electronic keys (for example, public key IDs and corresponding alias) and a list of electronic locks (for example, public lock IDs and corresponding alias). As described herein, a user may be able to access and edit a lock file and a master domain file when a master key is coupled to a user device (for example, connected to a laptop computer or a desktop computer via USB connector interface).

Figure 16B:
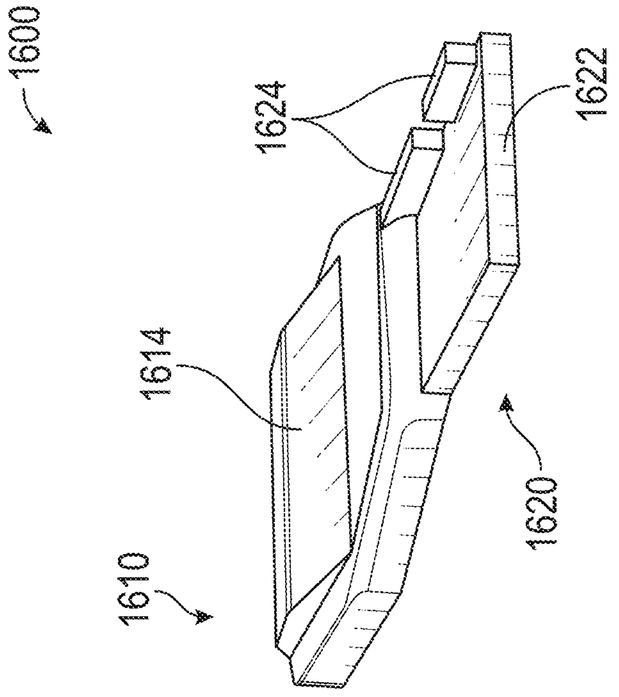
FIGS. 16A and 16B illustrate perspective views of an embodiment of an electronic key.
Figure 16A:
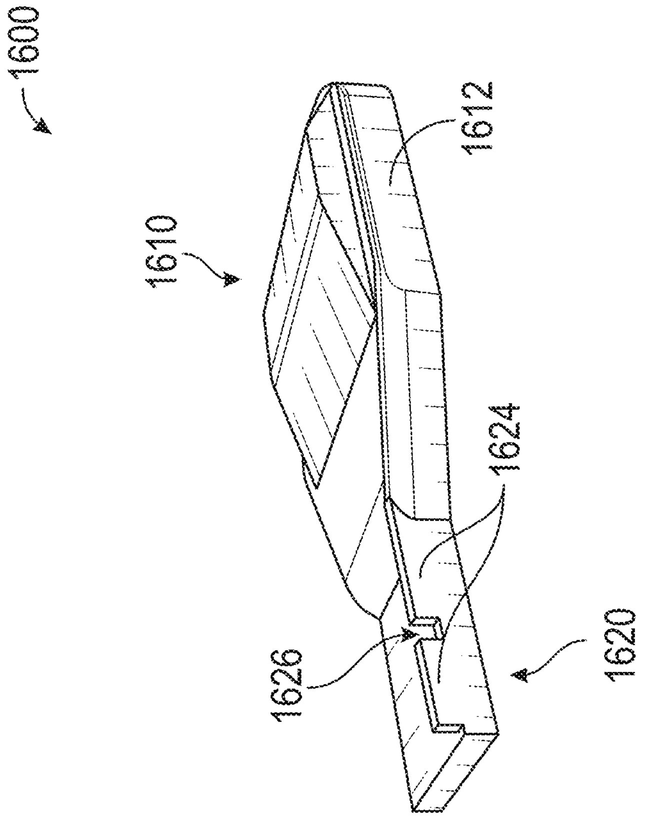

FIGS. 16A and 16B illustrate perspective views of an embodiment of an electronic key 1600. The electronic key 1600 can include a first portion 1610 and a second portion 1620. The first portion 1610 and the second portion 1620 can be connected to form a unitary body for the electronic key 1600. The first portion 1610 can be a gripping portion of the electronic key 1600. The first portion 1610 can include a body 1612 housing various electronics including, for example, memories, processors, and storage devices for the electronic key 1600. The electronic key 1600 can include circuitries and/or any variants of the circuitries disclosed herein.

The body 1612 can include a gripping aid 1614 that can facilitate gripping of the first portion 1610. The gripping aid 1614 can include at least one of grooves, ridges, bumps, protrusions, or any suitable device or mechanism to facilitate gripping of the first portion 1610. In the example shown in FIGS. 16A and 16B, the gripping aid 1614 is a protrusion formed on, for example, a top surface of the body 1612. The gripping aid 1614 can indicate where a thumb of a user may be placed on the body 1612 when gripping the first portion 1610. For example, the thumb of a user can be placed on top of the gripping aid 1614 while an index finger of the user can be placed below and rest against a bottom surface (that is, a surface opposite of the gripping aid 1614) of the body 1612 such that the first portion 1610 of the electronic key 1600 is positioned between and gripped by the thumb and the index finger. The protrusion 1614 can rest against the user's thumb to prevent the electronic key 1600 from sliding away while the user is holding on to the electronic key 1600.

In some embodiments, the body 1612 can include one or more of the gripping aid 1614. The gripping aid 1614 can be disposed on one or more of the outer surfaces of the body 1612. For example, the gripping aid 1614 (for example, a protrusion as shown in FIGS. 16A and 16B) can be disposed on the top surface or the bottom surface of the body 1612.

In some embodiments, the first portion 1610 can be manufactured using a grippy, non-slip material (for example, silicone) that can advantageously improve a user's grip when holding onto the first portion 1610. In some embodiments, the first portion 1610 can be, additionally or alternatively, coated with a grippy, non-slip material.

The second portion 1620 can be a connection interface. The second portion 1620 can be inserted into an opening of an electronic lock. The second portion 1620 can implement a data transfer interface and include one or more pins that facilitate data transfer between the electronic key 1600 and another electronic device (for example, an electronic lock or a computer). It is contemplated that different pin configurations can be used. The pins of the second portion 1620 can be coupled to electronics housed within the body 1612 of the first portion 1610 such that electrical signals can be transmitted between the pins and the electronics housed within the body 1612.

The pins may be positioned or printed on the second portion 1620 such that when the second portion 1620 is inserted into a corresponding opening or slot of, for example, an electronic lock, the pins can come into contact with corresponding pins (or electrical contacts) of the electronic lock. The contact between the pins of the second portion 1620 and the corresponding pins of the electronic lock can allow electronic data transmission between the electronic key 1600 and the electronic lock. In some embodiments, the pins may be positioned on the top surface (that is, the surface facing upward in FIG. 16A), the bottom surface (that is, the surface facing downward opposite of the gripping aid 1614), either of the side surfaces (that is, surfaces that are positioned between and orthogonal to the top and the bottom surfaces), or the front surface (that is, the surface positioned between the top, bottom, and the side surfaces and facing away from the first portion 1610) of the second portion 1620. In some embodiments, the pins may be positioned on one or more of the aforementioned surfaces of the second portion 1620.

The second portion 1620 can include one or more rails 1624. As shown in an example embodiments shown FIGS. 16A and 16B, the second portion 1620 can include two rails 1624 and a notch 1626 positioned and formed between the rails 1624. In some embodiments, the second portion 1620 can include more than two rails and more than one notch.

Various combinations of positions or orientations of the rails 1624 and the notch (or notches) 1626 may be utilized. The second portion 1620 can include two or more sets of rails that are disposed on the same surface or different surfaces of the second portion 1620. For example, both a first set of rails 1624 and a second set of rails 1624 can be disposed on the top surface (or the bottom surface) of the second portion 1620. In other examples, the first set of rails 1624 can be disposed on the top surface (for example, as shown in an example embodiment of the electronic key 1600 in FIG. 16A) of the second portion 1620 while the second set of rails 1624 can be disposed on the bottom surface of the second portion 1620.

In some embodiments, the two or more sets of rails 1624 can be disposed on the same side (or edge) or different sides of the second portion 1620. For example, a first set of the rails 1624 can be positioned on the right side (for example, as shown in an example embodiment of the electronic key 1600 in FIG. 16A) of the second portion 1620 while the second set of the rails 1624 can be positioned also on the right side or on the left side of the second portion 1620.

In some embodiments, the rails 1624 can be disposed next to each other (for example, adjacent to each other lengthwise or widthwise). For example, a first set of rails 1624 and a second set of rails 1624 can both be disposed about the right side (or edge) of the top surface of the second portion 1620.

The rails 1624 can extend along an axis parallel to the length of the second portion 1624. In some examples, the rails 1624 can extend along the entire length of the second portion 1624. Alternatively, the rails 1624 can extend along at least a portion of the length of the second portion 1624.

As shown in an example embodiment shown FIGS. 16A and 16B, the rails 1624 can have a rectangular cross-sectional shape. However, the rails 1624 can have a different cross-sectional shape including, but not limited to, semi-circular, triangular, square, and the like. The cross-sectional shape of the rails 1624 may be irregular.

Depending on the orientation of the electronic key 1600, the rails 1624 and the notches 1626 can facilitate coupling and decoupling of the electronic key 1600 and an electronic lock. For example, an electronic lock can include an opening (for example, a key hole) having a groove that corresponds to the rails 1624 of the electronic key 1600. The shape of the groove of the opening of the electronic lock may correspond the cross-sectional shape of the rails 1624 to allow the rails 1624 and the second portion 1620 to be inserted into the opening of, for example, the electronic lock. The electronic key 1600 may need to be in a certain orientation in order for the second portion 1620 of the electronic key 1600 to be inserted into the opening of the electronic lock. When in a first orientation, the rails 1624 of the electronic key 1600 may align with a corresponding groove of an opening the electronic lock such that the second portion 1620 can be inserted into the opening of the electronic lock.

Once the electronic key 1600 is inserted into the opening of the electronic lock, the notch 1626 can prevent decoupling of the electronic key 1600 from the electronic lock. Once the electronic key 1600 is coupled with the electronic lock (for example, inserted into the opening of the electronic lock) in a first orientation, the electronic key 1600 can be turned (for example, rotated about an axis parallel to the length of the second portion 1620 of the electronic key 1600) such that the electronic key 1600 is in a second orientation. Once the electronic key 1600 is turned (for example, in the second orientation), the notch 1626 can engage a corresponding protrusion located inside the opening of the electronic lock and prevent decoupling of the second portion 1620 of the electronic key 1600 from the electronic lock. When the electronic key 1600 is in the second orientation, the corresponding protrusion of, for example, the opening of the electronic lock, may be inserted within the notch 1626 (that is, between the rails 1624) such that the rails 1624 prevent longitudinal (that is, along an axis parallel to the length of the electronic key 1600) movement of the electronic key 1600 (for example, pulling the electronic key 1600 out of the opening of the electronic lock. In other words, when the electronic key 1600 is in the second orientation, it may not be decoupled from the electronic lock. When the electronic key 1600 is brought back to the first orientation (that is, the position of the electronic key 1600 when it was inserted into the opening of the electronic lock), the notch 1626 no longer engages the corresponding protrusion of the electronic lock and allows the electronic key 1600 to be removed from the opening of the electronic lock. The first orientation and the second orientation of the electronic key 1600 may be angularly offset from each other about, for example, an axis parallel to the length of the second portion 1620.

The rails 1624 can, as shown in FIGS. 16A and 16B, extend from the top surface of the second portion 1620. In some embodiments, the rails 1624 may extend from other surfaces (that is, the side surfaces, the bottom surface, and the front surface) of the second portion 1620.

In some embodiments, the rails 1624 can be perpendicular with respect to, for example, the top surface of the second portion 1620. Alternatively, the rails 1624 can extend at an angle less than 90 degrees or greater 90 degrees with respect to the top surface of the second portion 1620. In some embodiments, the rails 1624 can be positioned about side edges (for example, the left edge or the right edge) of, for example, the top surface of the second portion 1620. Additionally or alternatively, the rails 1624 can be positioned anywhere between the side edges of the top surface (or any one of other aforementioned surfaces) of the second portion 1620.

The following description is merely illustrative in nature and is in no way intended to limit the disclosure, its application, or uses. For purposes of clarity, the same reference numbers will be used in the drawings to identify similar elements. It should be understood that operations within a method may be executed in a different order, or at least partially in parallel, without altering the principles of the present disclosure.

It is recognized that the term "module" may include software that is independently executable or standalone. A module can also include program code that is not independently executable. For example, a program code module may form at least a portion of an application program, at least a portion of a linked library, at least a portion of a software component, or at least a portion of a software service. Thus, a module may not be standalone but may depend on external program code or data in the course of typical operation.

Conditional language used herein, such as, among others, "can," "might," "may," "for example," and the like, unless specifically stated otherwise, or otherwise understood within the context as used, is generally intended to convey that certain embodiments include, while other embodiments do not include, certain features, elements or states. Thus, such conditional language is not generally intended to imply that features, elements or states are in any way required for one or more embodiments or that one or more embodiments necessarily include logic for deciding, with or without author input or prompting, whether these features, elements or states are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. Further, the term "each," as used herein, in addition to having its ordinary meaning, can mean any subset of a set of elements to which the term "each" is applied.

Although systems and methods of electronic access control are disclosed with reference to few various examples, other embodiments will be apparent to those of ordinary skill in the art from the disclosure herein. Moreover, the described embodiments have been presented by way of example only, and are not intended to limit the scope of the inventions. Rather, a skilled artisan will recognize from the disclosure herein a wide number of alternatives for the exact ordering of operations within disclosed processes, how an electronic key is implemented, how an electronic lock is implemented, or how an admin application is implemented. Other arrangements, configurations, and combinations of the embodiments disclosed herein will be apparent to a skilled artisan in view of the disclosure herein and are within the spirit and scope of the inventions as defined by the claims and their equivalents.

Additionally, other combinations, omissions, substitutions and modifications will be apparent to the skilled artisan in view of the disclosure herein. Accordingly, the present disclosure is not intended to be limited by the examples, but is to be defined by reference to the appended claims.

Additionally, all publications, patents, and patent applications mentioned in this specification are herein incorporated by reference to the same extent as if each individual publication, patent, or patent application was specifically and individually indicated to be incorporated by reference.

What is claimed is:

1. An electronic lock comprising:

a memory configured to store a private lock identifier and a public lock identifier, wherein the public lock identifier is associated with an alias stored at an electronic key; and a controller configured to:

generate one or more shared secrets using the private lock identifier and a key code received from the electronic key, wherein the one or more shared secrets are shared between the electronic lock and the electronic key;

establish communication with the electronic key;

authenticate the electronic key based at least in part on a first access data structure stored in the memory of the electronic lock; and responsive, at least in part, to establishing communication with the electronic key and successfully authenticating the electronic key, automatically modify access to the electronic lock by automatically updating the first access data structure based on a second access data structure stored at the electronic key, wherein the first access data structure and the second access data structure each store an identity of one or more electronic keys that have access rights to the electronic lock.

2. The electronic lock of claim 1, further comprising an actuator configured to switch between a first state associated with a locked position and a second state associated with an unlocked position.

3. The electronic lock of claim 2, further comprising a latch, wherein the actuator switching between the first state and the second state actuates the latch.

4. The electronic lock of claim 2, wherein the controller causes the actuator to switch between the first state and the second state in response to receiving a command from a mobile application executing on a wireless computing device.

5. The electronic lock of claim 2, wherein the controller causes the actuator to switch between the first state and the second state in response to receiving a signal corresponding to successful authentication of a user by a mobile application.

6. The electronic lock of claim 1, wherein the electronic lock is configured to remain in a locked state when the electronic lock is unpowered.

7. The electronic lock of claim 1, wherein the public lock identifier is modifiable.

8. The electronic lock of claim 1, wherein the public lock identifier is unique to the electronic lock.

9. The electronic lock of claim 1, wherein the key code comprises a public key identifier of the electronic key.

10. The electronic lock of claim 9, wherein one or more memory locations of the memory corresponds to one or more users of the electronic lock.

11. The electronic lock of claim 10, wherein the memory stores one or more private identifiers for the one or more users that correspond to a location identifier in the memory.

12. The electronic lock of claim 11, wherein one or more public identifiers are linked to a corresponding memory location in the memory, and wherein the corresponding memory location is associated with an alias of a user.

13. The electronic lock of claim 1, wherein the controller is further configured to use a shared secret of the one or more shared secrets to decrypt an encrypted identifier received from the electronic key.

14. The electronic lock of claim 13, wherein the controller is further configured to authenticate the electronic key based at least in part on the encrypted identifier.

15. The electronic lock of claim 1, wherein the controller is further configured to use a shared secret of the one or more shared secrets to encrypt an identifier transmitted to an electronic key.

16. The electronic lock of claim 15, wherein the encrypted identifier is a private identifier.

17. The electronic lock of claim 1, wherein the public lock identifier is transmitted to the electronic key to generate a copy of a shared secret of the one or more shared secrets at the electronic key.

18. The electronic lock of claim 1, wherein the controller is further configured to receive the key code from the electronic key using an NFC receiver.

19. The electronic lock of claim 1, wherein the electronic lock is configured via a connection to a wireless computing device.

20. The electronic lock of claim 1, wherein the electronic lock is powered by a wireless computing device that implements the electronic key.

21. The electronic lock of claim 1, wherein the alias differs from the public lock identifier and is associated with the electronic lock.

22. The electronic lock of claim 1, wherein automatically updating the first access data structure stored in the memory of the electronic lock comprises adding a key identifier of a second electronic key to the first access data structure or removing the key identifier of the second electronic key from the first access data structure of the electronic lock.

23. The electronic lock of claim 1, wherein the first access data structure comprises key access information.

24. The electronic lock of claim 1, wherein the second access data structure comprises a lock configuration file.

* * * * *